United States Patent
Schwartz et al.

(10) Patent No.: US 11,036,354 B2
(45) Date of Patent: Jun. 15, 2021

(54) INTEGRATING DESKTOP AND MOBILE DEVICES

(71) Applicants: Daniel Schwartz, San Francisco, CA (US); Arin Bhowmick, Fremont, CA (US)

(72) Inventors: Daniel Schwartz, San Francisco, CA (US); Arin Bhowmick, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 15/383,909

(22) Filed: Dec. 19, 2016

(65) Prior Publication Data

US 2018/0173379 A1    Jun. 21, 2018

(51) Int. Cl.
*G06F 3/048*        (2013.01)
*G06F 3/0482*       (2013.01)
*H04L 29/08*        (2006.01)

(52) U.S. Cl.
CPC .......... *G06F 3/0482* (2013.01); *H04L 67/025* (2013.01); *H04L 67/10* (2013.01); *H04L 67/34* (2013.01)

(58) Field of Classification Search
CPC ....... G06F 3/0482; G06F 3/1423–1446; H04L 67/10; H04L 67/025; H04L 67/34; G06Q 10/06
USPC ....................................................... 715/761
See application file for complete search history.

(56) References Cited

U.S. PATENT DOCUMENTS

| | | | |
|---|---|---|---|
| 5,535,324 A | 7/1996 | Alvarez et al. | |
| 5,668,959 A * | 9/1997 | Malcolm | G06F 9/451 |
| | | | 715/762 |
| 8,933,949 B2 * | 1/2015 | Reeves | G06F 3/1431 |
| | | | 345/522 |
| 9,015,578 B2 | 4/2015 | Cooper | |
| 2006/0085753 A1 | 4/2006 | Vance et al. | |
| 2009/0051701 A1* | 2/2009 | Fleming | G06F 9/541 |
| | | | 345/619 |
| 2009/0254861 A1 | 10/2009 | Seetharamakrishnan et al. | |
| 2011/0185312 A1 | 7/2011 | Lanier et al. | |

(Continued)

OTHER PUBLICATIONS

Luyten, Kris, et al; "Constraint Adaptability of Multi-Device User Interfaces"; Proceedings of CHI 2006 Workshop; 6 pages.

(Continued)

*Primary Examiner* — Keith D Bloomquist
(74) *Attorney, Agent, or Firm* — Trellis IP Law Group, PC

(57) ABSTRACT

A system and method for facilitating user interface interactions between different computing devices. An example method includes providing a first user option to select a first portion of a first user interface display screen presented on a first computing device; providing a signal based on the selected portion; and using the signal to display one or more items in a second user interface display screen via a second computing device based on the first portion and one or more mapping rules. In a more specific embodiment, the example method further includes providing a second user option to adjust the mapping rules. The first portion includes, for example, a table row or column. The one or more items displayed via the second computing device include, for example, a visualization based on data associated with the first portion.

20 Claims, 10 Drawing Sheets

(56) References Cited

U.S. PATENT DOCUMENTS

| | | | |
|---|---|---|---|
| 2011/0239142 A1* | 9/2011 | Steeves | G06F 3/14 |
| | | | 715/764 |
| 2011/0304557 A1* | 12/2011 | Wilburn | G06F 3/0488 |
| | | | 345/173 |
| 2012/0084542 A1* | 4/2012 | Reeves | G06F 13/14 |
| | | | 713/1 |
| 2013/0290858 A1 | 10/2013 | Beveridge | |
| 2014/0068520 A1 | 3/2014 | Missig et al. | |
| 2014/0082511 A1* | 3/2014 | Weissberg | G06F 9/452 |
| | | | 715/740 |
| 2014/0101606 A1* | 4/2014 | Albrecht | G06F 3/0481 |
| | | | 715/803 |
| 2014/0280877 A1* | 9/2014 | Koulomzin | H04L 43/16 |
| | | | 709/224 |
| 2015/0113455 A1* | 4/2015 | Kang | G06F 3/04842 |
| | | | 715/765 |
| 2015/0293746 A1* | 10/2015 | Tsern | G06F 3/0412 |
| | | | 715/728 |
| 2017/0010847 A1* | 1/2017 | Bernstein | G06F 1/1662 |

OTHER PUBLICATIONS

Grundy, John, et al; "AUIT: Adaptable User Interface Technology, with Extended Java Server Pages" Proceedings from Department of Computer Sciences, University of Auckland; 2003; 15 pages.

* cited by examiner

INTEGRATING DESKTOP AND MOBILE DEVICES

CROSS REFERENCES TO RELATED APPLICATIONS

This application is a continuation of the following application, U.S. patent application Ser. No. 14/024,530, entitled DESKTOP AND MOBILE DEVICE INTEGRATION, filed on Sep. 11, 2013, which is hereby incorporated by reference, as if set forth in full in this application for all purposes.

This application is related to the following application, U.S. patent application Ser. No. 15/200,659, entitled ADJUSTING ENTERPRISE SECURITY USING A MOBILE DEVICE, filed on Jul. 1, 2016, which is hereby incorporated by reference, as if set forth in full in this specification.

BACKGROUND

The present application relates to software and more specifically to user interface designs and accompanying methods for facilitating interaction between different computing devices or resources.

Software and methods for facilitating coordination of data and activities across multiple computing devices are employed in various demanding applications, including distributed enterprise computing applications, remote access software for employing mobile devices to communicate with desktop devices, and so on. Such applications often demand efficient mechanisms for enabling different devices, such as mobile devices and desktop computers, to access similar software or functionality to enhance user productivity.

For example, an enterprise employee may have a mobile device (e.g., a smartphone, tablet, laptop, etc.) and a desktop computer at work. The employee may run a given software application on the desktop computer. To use the mobile device to access similar functionality as provided by the desktop software application, a mobile version of the software application is installed on the mobile device. Alternatively, both the desktop and mobile device applications are cloud based, i.e., run on a server (i.e., server side) and accessed by browsers running on the different devices. In other cases, similar operating systems are run on both the mobile device and desktop computer, enabling running similar software applications on the different devices.

However, such configurations typically lack or overlook mechanisms for enabling functionality of each computing device or resource to fully complement each other. Absence of such mechanisms may reduce user productivity and inhibit efficient performance of computing tasks.

SUMMARY

An example method facilitates user interface interactions between different computing devices and includes providing a first user option to select a first portion of a first user interface display screen presented on a first computing device; providing a signal based on the selected portion; and using the signal to display one or more items in a second user interface display screen via a second computing device based on the first portion and one or more mapping rules.

In a more specific embodiment, the example method further includes providing a second user option to adjust the mapping rules. The first portion includes a table row or column. The one or more items displayed via the second computing device include a visualization based on data associated with the first portion.

In an illustrative embodiment, the method further includes monitoring usage of software employed to implement the method to facilitate determining the one or more mapping rules. Alternatively or in addition, the one or more mapping rules are based on one or more characteristics, such as resolution, graphics resources, and so on, of the second computing device. Alternatively or in addition, the one or mapping rules are based, in part, on contextual information associated with the first portion.

The one or more items displayed via the second user interface display screen include a list of one or more user interface features previously accessed by a user in association with the first portion. The one or more user interface features may include displayed data, including one or more user interface controls.

The method may further include selecting for display via the second computing device, the one or more user interface controls in accordance with a recency of use of the one or more user interface controls.

The one or more user interface features may include one or more items previously marked by a user, e.g., marked as favorites in association with the one or more user interface features of the first portion selected in the first user interface display screen of the first computing device. The first computing device may include a desktop computer or mobile device, and the second computing device may include a mobile device or desktop computer, respectively.

The method may further include running software on a server, wherein the software is accessible to the first computing device and the second computing device to render the first portion of the first user interface display screen and the one or more items of the second user interface display screen in accordance with the one or more mapping rules.

Functionality associated with the one or more items may enable user adjustment to both the first user interface display screen and the second user interface display screen, including user adjustment to underlying data associated with the first and second user interface display screens.

The one or more items displayed via the second computing device may include a user interface control for saving data included in the first portion. The one or more items may further include a user interface control for posting data included in the first portion and illustrated via the one or more items to a server.

The first computing device may include a mobile device, and the first portion may include an item that is adapted to replace a preselected portion of a user interface display screen of the second computing device based on the signal and the one or more mapping rules. The second computing device may include a desktop computer.

In another embodiment, the first portion includes a toolbar of a user interface display screen presented via a desktop computer. The one or more items include one or more user interface controls displayed via a user interface display screen presented via the mobile device. The one or more user interface controls correspond or represent one or more items in the toolbar.

The one or more user interface controls are responsive to user input and may be employed to affect or adjust the first user interface display screen and the second user interface display screen. The first portion may include static data and/or dynamic data. The static or dynamic data may include contextual information.

Accordingly, by enabling selective coupling of data and functionality between different computing devices (and associated displays), such as a mobile device and a desktop device in accordance with predetermined mapping rules, mobile device functionality may be efficiently employed to complement desktop device functionality, thereby enhancing functional synergy between devices. The mapping rules may be based on contextual information, such that items displayed via one device reflect data and functionality that is pertinent to selected or in-focus user interface features of another device. User interface controls displayed via the different devices may be employed to control software running on both devices.

Furthermore, use of certain embodiments disclosed herein may enhance functional synergy between devices by enabling interaction paradigms and workflows involving simultaneous use of computing devices. Such interaction paradigms, which may include synchronous and/or asynchronous interactions, may enhance productivity, usability, and portability of software and associated data and functionality running on both devices or otherwise accessible to both devices.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Examples of enterprise software applications include Financials, Assets, Procurement, Projects, Supply Chain, and so on. The terms "enterprise software" and "enterprise application" may be employed interchangeably herein.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include an employee record, a product record, and so on. Examples of data that may be included in an object include employee name and address information, job role, performance ratings, project or task information, appointment records, and so on. An example of functionality that may be associated with or included in an object includes software functions or processes for issuing a reminder for an appointment.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
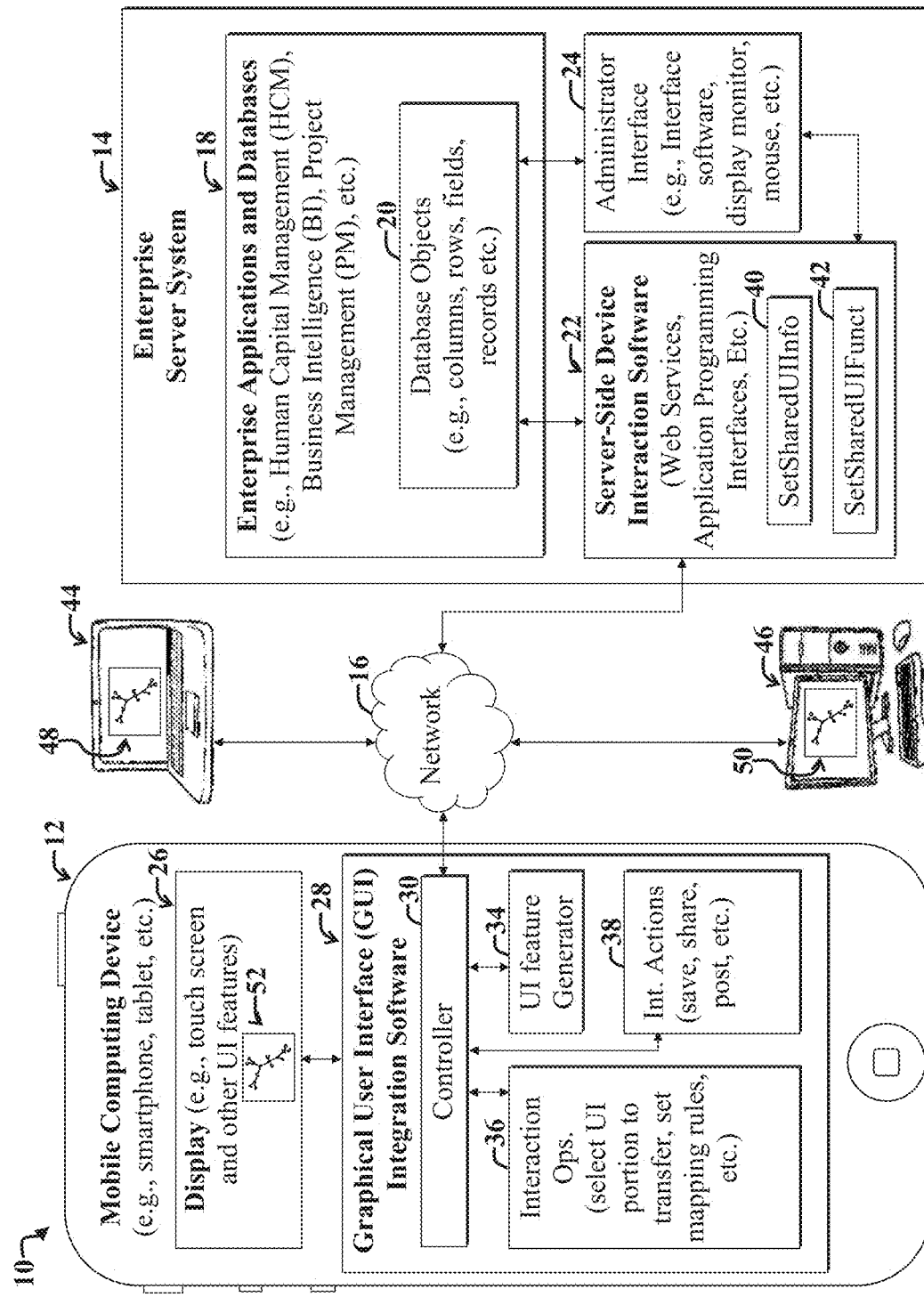
FIG. 1 is a diagram illustrating an example enterprise computing environment and accompanying system for enabling selectively sharing of user interface functionality and data between computing devices, such as mobile devices and desktop computers.

FIG. 1 is a diagram illustrating an example enterprise computing environment 10 and accompanying system for enabling selectively sharing of user interface functionality and data between computing devices 12, 44, 46, 14, such as mobile devices 12, 44 and desktop computers 46.

For the purposes of the present discussion, an enterprise computing environment may be any computing environment used for an enterprise. A computing environment may be may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, mobile devices, and so on.

The enterprise computing environment 10 includes a first mobile device 12, e.g., a smartphone 12, a second mobile device 14, e.g., a laptop 44, and a desktop computer 46, in communication with an enterprise server system 14 via a network 16, such as the Internet. The devices 12, 44, 46 may represent client devices of the enterprise server system 14.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

A mobile computing device may be any computer that is adapted for portable use. In general, a computing device may be any computer. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on. Various specific example embodiments discussed herein may employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

In the present example embodiment, server-side device interaction software 22, such as web services, Application Programming Interfaces (APIs), and so on, may communicate with database objects 20 maintained by enterprise applications and databases 18 to selectively employ data thereby, such as to facilitate implementation of various software applications, which may include server-side and client-side software applications. Generally, server-side implementations involve running applications on the enterprise server 14 in response to a request from a client, such as the mobile computing device 12. Server-side applications may then send data and/or instructions back to the client device 12. In client-side implementations, software may be downloaded to the mobile computing device 12 and executed locally on the device 12.

The example enterprise server system 14 includes an administrator user interface 24, which may include hardware and software functionality for enabling an administrator to make changes to various components of the enterprise server system 14, such settings, installed software, and so on. Enterprise server system components include various enterprise software applications and databases 18, which may which store and facilitate access to database objects 20.

The mobile computing device 12 represents an example client device that communicates with the server-side device interaction software 22. Note that client devices other than mobile computing devices and desktop client devices may be employed without departing from the scope of the present teachings. For example, the enterprise server system itself 14 may have one or more display monitors that present user interface display screens that may be adapted for use with various embodiments discussed herein.

For the purposes of the present discussion, a user interface display screen may be any software-generated depiction presented on a display. Examples of depictions include windows, dialog boxes, displayed tables, and any other graphical user interface features, such as user interface controls, presented to a user via software, such as a browser.

A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The server-side device interaction software 22 further includes modules 40, 42, which are adapted to communicate with client-side Graphical User Interface (GUI) integration software 28 to facilitate sharing or integrating user interface display screen features and functionality between devices 12, 44, 46 communicating with the server-side device interaction software 22.

For example, a SetSharedUIInfo( ) function 40 is adapted to selectively store data to be shared between the mobile device 12 and one or more other devices 44, 46. A SetSharedUIFunct( ) function 42 is adapted to store or indicate user interface functionality, including user interface controls, to be selectively shared between devices 12, 44, 46, as discussed more fully below. The stored data and/or functionality may be data and/or functionality provided via enterprise applications and databases 18, which is currently being used or accessed by one or more of the client devices 12, 44, 46.

The example mobile computing device 12 employs a touch screen 26 (also simply called a display herein) in communication with Graphical User Interface (GUI) integration software 28. The GUI integration software 28 is adapted to facilitate displaying user interface features 52, e.g., components or elements, including data and user interface controls via the touch screen 26. The user interface features 52 may represent modified selections of user interface display screens from another mobile device 44 or desktop computer 46, where the modifications are in accordance with so-called mapping rules, as discussed more fully below. Furthermore, the GUI interaction software 28 may facilitate posting representations of portions of the display screen features 52 to other devices, social networks, websites, and so on, as discussed more fully below.

For the purposes of the present discussion, GUI software generally may be any software application or component, such as a spread sheet program, graphing software, and so on, that is adapted to facilitate displaying graphical user interface features and/or data, such as graphs, menu items, dialog boxes, and so on.

The example GUI software 28 includes a controller 30 in communication with a User Interface (UI) feature generator 34, an interaction operations module 36, and an interaction actions module 38. The controller 30 includes computer code for coordinating inputs and outputs to and from the modules 34-38 and interfacing the GUI integration software 28 and accompanying modules 34-38 with the server-side device interaction software 22.

The interaction operations module 36 may include computer code and data for implementing various functions, such as enabling selection of UI features 52, determining UI features 48, 50 selected on other devices (e.g., with reference to the server-side device interaction software 22), storing mapping rules and enabling user modifications thereto, and so on. An interaction actions module 38 includes computer code for implementing functionality associated with manipulating the UI features 52, such as saving, sharing, posting to a website, and so on.

For the purposes of the present discussion, a mapping rule may be any set of instructions or information specifying how a first item or thing is transformed into a second item or thing. In the context of the present discussion, the first item or thing may be a portion (e.g., corresponding to the desktop features 50) of a user interface display screen of a first computing device, e.g., desktop computer 44, and the second item or thing may be a corresponding portion (e.g., the mobile device UI features 52) of a user interface display screen of a second computing device, e.g., the mobile computing device 12.

For example, if selection of a table row of a desktop computer display screen is transformed to a visualization based on data included in the table row and presented on a mobile device, the table row is said to be mapped to the mobile device display screen in accordance with mapping rules that specify transforming data in the table row to a visualization to be presented on the mobile device.

A portion of a user interface display screen may be any section, component(s), and/or user interface control(s) or collection of components, such as user interface controls, fields, and so on. Accordingly, a row or column of a displayed table, an entire table, a dialog box, a drop down menu, a widget, or other user interface item or feature may represent a portion or may be included in another portion of a user interface display screen. In the context of the present discussion, a portion of a user interface display screen may be considered to include functionality and data associated with a selected region or portion of a user interface display screen. In certain cases, a portion of a user interface display screen may include an entire user interface display screen and all of its components.

Various mechanisms for selecting a portion of a user interface display screen are possible. For example, a user may click on a dialog box or other user interface control, thereby bringing the dialog box or user interface control into focus, effectively selecting it. In this case, the dialog box or user interface control represents a selected portion. Alternatively, software functionality for enabling a user to drag a bounding box or other bounding shape, e.g., via a mouse cursor over a user interface display screen may enable selection of a portion of the user interface display screen. In this case, the selected portion is considered to include all data and user interface controls and other features indicated within the specified bounding box or shape. In certain embodiments, the selected portion is taken to include any functionality underlying or otherwise associated with user interface features or other items included within the boundary of the user specified bounding box.

For the purposes of the present discussion, software functionality may be any function, capability, or feature, e.g., stored or arranged data, that is provided via computer code, i.e., software. Generally, software functionality may be accessible via use of a user interface, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Those skilled in the art with access to the present teachings may readily develop software to implement functionality discussed herein to meet the needs of a given implementation, without undue experimentation.

In operation, a user may employ the mobile computing device 12 to browse to a website hosted by the enterprise server system 14, which provides access to the server-side device interaction software 22 and accompanying database objects 20.

The controller 30 may facilitate downloading database objects 20 from the enterprise server system 14 and server-side device interaction software 22 for use in constructing a user interface features 52 to be displayed via the touch screen 26. Alternatively, the data remains in the databases 18, and information needed to render corresponding user interface features 52 is provided by the server-side device interaction software 22.

Note that in the present example embodiment, data used to render the features 52 displayed via the mobile device 12 includes data used by other integrated computing devices 44, 46 to render corresponding user interface features 48, 50. Note, however, that alternative implementations are possible, wherein data and functionality for rendering features of a client device user interface display screen is not maintained by the enterprise server system 14, but is instead stored locally on one or more of the devices 12, 44, 46.

In the present example embodiment, the GUI integration software 28 is adapted to selectively download database objects 20 from the enterprise server system 18. The UI features generator 34 then employs client-side UI-generating software to construct one or more features 52 in accordance with instructions accessible to the controller 30 and input from the touch screen 26.

In the present example embodiment, the same user owns and uses the computing devices 12, 44, 46. In an example use case scenario, the user selects a portion of a user interface display screen of the desktop computer 46, where portion corresponds to the desktop UI display screen features 50. The desktop UI display screen features 50 have been derived from the enterprise server system 14, such as via the enterprise applications and databases 18 and accompanying server-side device interaction software 22.

Selection of the desktop features 50 results in a signal being sent to the server-side device interaction software 22 characterizing the selected section. A corresponding signal is then sent to the mobile device GUI integration software 28. The accompanying controller 30 may then employ the signal and associated information, with reference to mapping rules stored via the interaction operations module 36, to generate corresponding UI features 52 in accordance with the mapping rules.

The associated information used to determine how to display the UI features 52 may include contextual information, e.g., information about the originating computing environment, i.e., what is currently being worked on via the desktop computer 46 and displayed in association with the desktop features 50, as discussed more fully below.

For the purposes of the present discussion, contextual information may be any information or data that is adapted to facilitate conveying a state of a user interface display screen or computing environment. For example, if a dialog box pertaining to a particular sales order is displayed, contextual information may include information indicating that a sales order dialog box is displayed and that the sales order pertains to a specific customer of a specific company office in a particular geographic region.

In certain implementations, the mapping rules maintained by the interaction operations module 36 may be automatically determined and modified based on contextual information, including software usage history, user calendar entries, and so on. Accordingly, the mapping rules may include initial or default mapping rules that are initially determined by the GUI integration software 28. Note however, that the exact storage location of mapping rules may be implementation specific. For example, the mapping rules maintained via the interaction operations module 36 may be stored server side instead of on the mobile device 12, without departing from the scope of the present teachings.

Accordingly, key functionality for adjusting displayed UI features 52 on the mobile device 12 based on user selections 48, 50 made on one or more other devices 44, 46 may be included in various functions 40, 42 and modules 28-38

The example functions 40, 42 may be called remotely via the mobile device UI features generator 34, interaction operations module 36, and controller 30 as needed in response to certain user input to the mobile device 12 and/or other computing devices 44, 46, or automatically in accordance with instructions included in the controller 30. Alternatively, the functions 40, 42 may be downloaded to the mobile computing device 12 and/or other deices 44, 46 and run client-side.

Note that the server-side device interaction software 22 may include additional functionality other than that represented by the example functions 40, 42. For example, functions for altering a mobile device display based on a selection made via a desktop computer display screen, and so on, may be implemented via the server-side device interaction software 22 and/or may be implemented client-side via the GUI software 28.

Those skilled in the art with access to the present teachings may readily develop software to implement functionality discussed herein to meet the needs of a given implementation, without undue experimentation.

For the purposes of the present discussion, software functionality may be any function, capability, or feature, e.g., stored or arranged data, that is provided via computer code, i.e., software. Generally, software functionality may be accessible via use of a user interface, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Note that various modules shown in FIG. 1 may be combined into fewer modules or separated into additional modules, which may be implemented on a single device or more devices than shown, without departing from the scope of the present teachings.

In general, the server-side device interaction software 22 includes computer code adapted to selectively retrieve data from the databases 18 in response to a request message from the GUI integration software 28 for use in constructing user interface features, such as the mobile device user interface features 52. The data may be forwarded to the client-side GUI integration software 28 for representation on the display 26 as needed in response to client-side user input, including input from one or more of the devices 12, 44, 46.

In certain implementations, underlying data and functionality of a given user interface display screen maintained primarily in the databases 18 until needed to adjust a display screen and accompanying features. In other implementations, a local copy of underlying data and computer code for implementing software functionality is retrieved from the databases 18 and stored locally on the client device, e.g., mobile computing device 12, laptop 44, and/or desktop computer 46. Alternatively, the data and functionality is maintained via one or more of the computing devices 12, 44, 46.

Note that while the example GUI integration software 28 is shown included in the mobile device 12, implementations are not limited thereto. For example, the GUI integration software 28 may be incorporated into the server-side device interaction software 22 and run on the server 14 as a server-side application. The server side application may be run server-side and viewed client-side via browser software running on the mobile device 12.

In the present example embodiment, various GUI modules 34-38 include computer code for implementing functionality for adjusting how portion of a user interface display screen is displayed via the touch screen 26. Example operations, which may be implemented in part via the GUI integration software 28 include enabling multiple device interactions involving use of software functionality accessible via user interface display screens of different devices.

Example interactions include use of mobile device as an additional display or input device; sharing of actions or user interface display screen contextual information; adjusting displayed items and data in a user interface display screen in accordance with screen size, resolution, device resources (e.g., graphics and processor capabilities, available memory, etc.), and other contextual information; employing a mobile device as a conduit for a desktop device; converting a selected portion of a table in one user interface display screen, and proving user interface controls and a visualization of the table data via another user interface display screen of another device; selecting a data field in one user interface display screen, and generating a set of corresponding user interface controls in another display screen of another device; using a mobile device to insert data and or user interface display screen features and/or sections in another device; employing a mobile device as a base for different display screens for use as enterprise computing terminals; triggering display of a list of favorite items or user interface controls via a mobile device in response to a selection made via another computing device, and so on, as discussed more fully below.

Note that while the present embodiment is discussed as employing device integration software 28 in communication with server-side device interaction software 22, embodiments are not limited thereto. For example, functionality need not be hosted on an enterprise server. Certain embodiments may be implemented as a single software application running on a first computing device in communication with software running on a second computing device, without departing from the scope of the present teachings. The first and second computing devices need not be a mobile device and a desktop computer, but may include, for example two mobile devices.

In certain implementations, involving use of a first computing device, such as a mobile device, and a second computing device, the second computing device may actually include the first computing device, yet still be considered as a second computing device. For example, in one embodiment, e.g., as discussed more fully below with reference to FIG. 6, the second computing device may represent a desktop computer monitor coupled to the mobile computing device. In such cases, software that can run on a desktop computer processor (other than the mobile device) is not necessary to implement the embodiments, since any requisite software may be run from the mobile device and used to manipulate displayed information on the desktop computer monitor.

Figure 2:
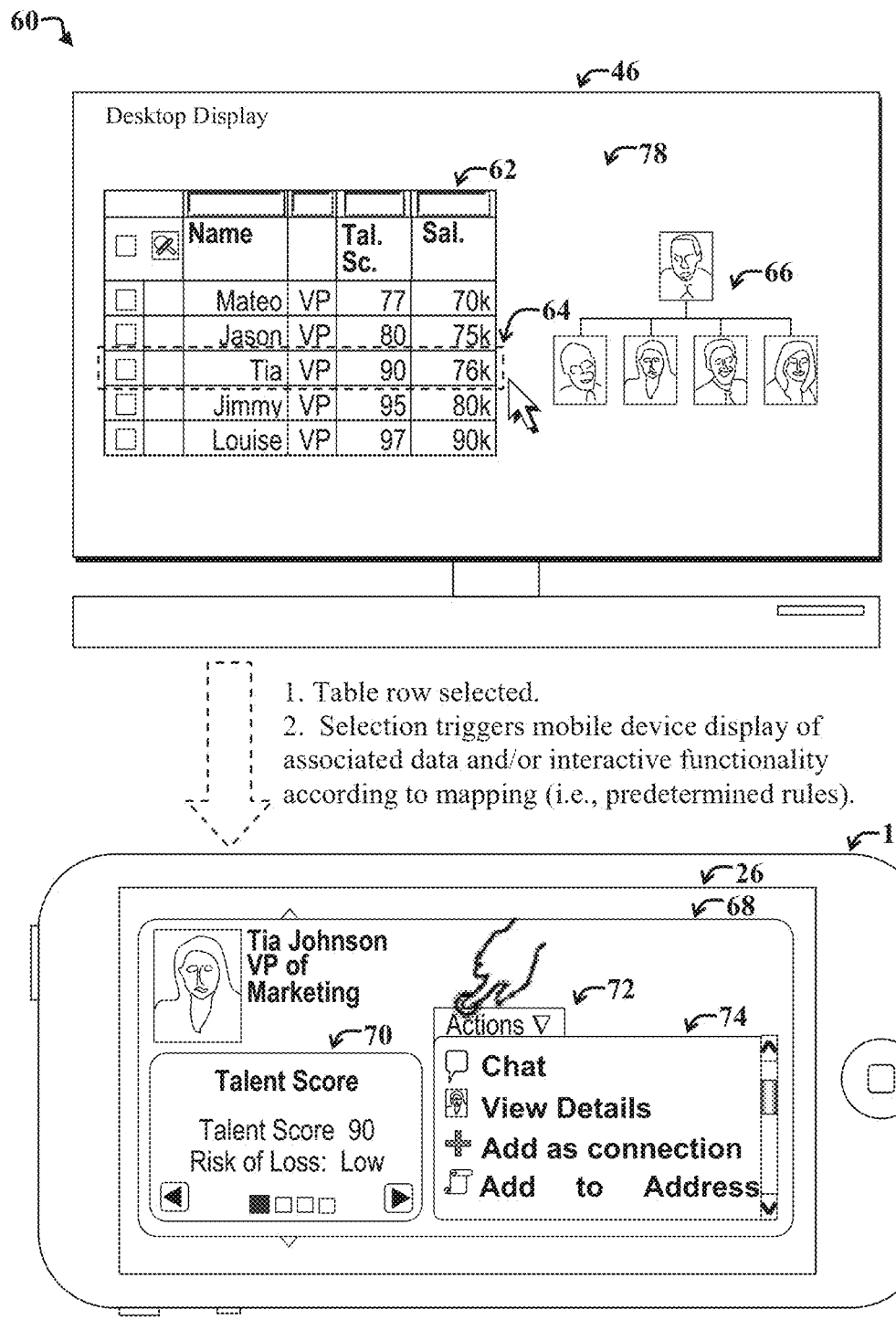
FIG. 2 shows a first set of example user interface display screens illustrating a mobile device screen that has been adjusted based upon user selection of a table row shown in a desktop computer screen.

FIG. 2 shows a first set of example user interface display screens 60 illustrating a mobile device user interface screen 68 that has been adjusted based upon user selection of a first portion 64 of a desktop computer user interface display screen 78. The mobile device user interface display screen 68 (also called the mobile device screen 68) is depicted on the touch display 26 of the mobile device 12. The desktop computer user interface display screen 78 (also called the desktop screen 78) is depicted via a display monitor of the desktop computer 46.

The desktop screen 78 includes various example features, including a table 62 (including data and checkbox user interface controls arranged in rows and columns of the table 62) and a visualization 66. The mobile device screen 68 represents a transformation or mapping of a selected first portion, i.e., example table row selection 64 of the desktop screen 78, where the transformation is performed in accordance with transformation rules, called mapping rules herein.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

Information visualization may be any process involving graphically representing data according to a method or scheme. A graphical representation of data resulting from an information visualization technique is called a visualization. Example visualizations include pie charts, treemaps, bar charts, line graphs, N-boxes, maps with data layers, and so on.

The mobile device screen 68 includes various features (i.e., UI elements or components), including a talent score section 70 and an actions drop-down menu 72, which provides various user interface controls 74, which are associated with underlying functionality, i.e., software actions. User selection of one of the user interface controls 74 in the actions menu 72 may influence or otherwise use or interact with data and functionality facilitated by the desktop screen 78.

For example, user selection of a view details user interface control from among the user interface controls 74 may trigger generation of a signal, which may be forwarded to a server used to generate data and functionality of the desktop screen 78. The signal is then used by the server to retrieve additional details associated with a computing object represented via the table row of the selection 64. In other implementations, the signal is forwarded directly to the desktop computer 46.

Note that while the present example set of user interface display screens 60 illustrate selection of a table row 64, embodiments are not limited thereto. In particular any table row, column, or combination of table rows and/or columns may be selected from a desktop or mobile device, which them may be used to affect content displayed on a mobile or desktop device, respectively, as discussed more fully below.

For the purposes of the present discussion, a software action, also simply called action herein, may be any process or collection of processes implemented via software. A user interface control may be associated with a software action, such that user selection of the user interface control triggers initiation of the action.

Note that the mobile device screen 68 may include additional user interface controls and illustrate additional data and visualizations not initially displayed via the desktop display. For example, the talent score section 70 may include data, visualizations, and user interface controls that are not illustrated in the initial table selection 64 from the desktop screen 78. Accordingly, the mobile device screen 68 may be used synergistically with the desktop screen 78, e.g., to facilitate augmenting user awareness as to data displayed in the desktop screen 78.

Furthermore, data and user interface controls depicted in the mobile device screen 68 may include dynamic and/or static data. For example, any changes made to data in the table row selection 64 may automatically or dynamically update data displayed in the mobile device screen 68.

For the purposes of the present discussion, dynamic data may be any data that is adapted to change, such as during use of software and an associated graphical user interface display screen. Static data may be any data that is adapted to stay fixed, i.e., static, for the duration of a given usage session of software.

In the present example embodiment, user interface controls, e.g., the controls 74, of the mobile device screen 68 may be responsive to touch input to affect both data displayed in via the mobile device screen 74 and in the desktop screen 78. Accordingly, data displayed via the desktop screen 78 may also be dynamically adjusted in response to user input to the mobile device screen 68.

For the purposes of the present discussion, touch input may be any input, such as input via a gesture, provided to a computing device via a touch-sensitive display. A gesture may be any movement that involves motion to trigger a signal to control or otherwise affect a user interface display screen.

Accordingly, the set of user interface display screens 60 illustrate an example method for user interface interactions between computing devices 12, 46, which involves, enabling a selection in a first user interface display screen 78 to result in a corresponding updated user interface display screen 68 of a second device 12. Such updating may be performed, for example, by issuing a signal to a commonly accessed server (and associated data and functionality) in response to the use selection 64, as discussed above with reference to FIG. 1.

Note that in certain implementations, selection of the table row 64 may be performed via use of a bounding box, or alternatively, may involve simply bringing an item (user interface display feature) of a user interface display screen into focus.

A vendor of software for implementing the present example embodiment may employ a product team to integrate existing software applications with specialized APIs (e.g., as implemented via the server-side device interaction software 22 of FIG. 1) to enable specific behaviors when a first device (e.g., the desktop computer 46) is paired with a second device (e.g., the mobile device 12). Support may be included for web and/or desktop-based software implementations.

An end user may download and install a special application (e.g., the GUI integration software 28 of FIG. 1) that can communicate with other vendor products on a desktop device, laptop device, mobile device, or other type of computing device. A user may enable WiFi, Bluetooth, Universal Serial Bus (USB), Firewire, and/or other functionality to pair a mobile device with a desktop and/or laptop computer.

In an example use case, a user logs into a vendor web and/or desktop application adapted to facilitate implementing embodiments discussed herein. Depending on multi-tasking capabilities of the mobile device, the specialized mobile application (e.g., GUI integration software 28) may immediately come to focus and begin showing contextual information and actions as defined by the current product.

Note that login credentials may still be required depending on security rules set up by a companying using the vendor-supplied software. For some devices, the user may need to launch the application explicitly to bring the application into focus.

In the present example use case, an enterprise Human Resources (HR) representative wishes to search for and contact specific employees. The HR representative can now quickly view full profiles and pictures afforded by rich contextual information presented on the mobile device 12; may quickly save their pertinent contact information, and call the employees from their mobile device whether they are at an office or elsewhere. This can be particularly useful for representatives that are often travelling as a part of their work.

In a second example use case, a column of the table 62 or the entire table 62 may be selected (as opposed to just the table row 64). For a specifically selected data table column that has focus on the desktop screen 78, the mobile device 12 serves as an additional display and/or input device to respectively show contextual information and/or actions. Depending on the mobile device and its screen size, the data displayed and its visual style may be different to best accommodate the device and ensure an optimal user experience.

The second example use case involves an HR representative that wishes to understand where a majority of employees he/she supports lives to see how employee commuting can be improved. The HR representative selects an address column of a table of employees 62. The mobile device screen 68 is then updated to show such data in a visual map format with those same addresses now as pins on the map. The HR representative could then visually interpret the data via a familiar and interactive map interface to facilitate further understanding of employee home locations and their commutes.

In summary, the present example embodiment may be considered as implementing a method for presenting respective contextual information on a mobile device for selected content from a desktop device ranging from page level to data field level. The respective contextual data can be static or dynamic and be presented based on pre-set rules or via system learning of users behaviors.

For a specifically selected data table row that has focus on a desktop/laptop computer screen/additional larger monitor, a mobile device will serve as an additional display and/or input device to respectively show contextual information and/or actions. Depending on the mobile device and its screen size, the data displayed and its visual style may be different to best accommodate the device and ensure an optimal user experience.

Figure 3:
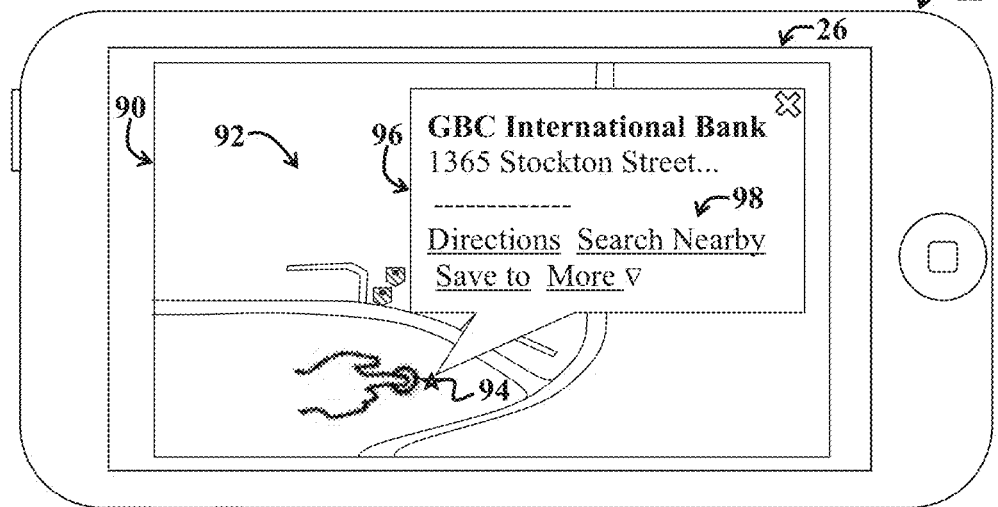
FIG. 3 shows a second set of example user interface display screens illustrating a mobile device screen that has been adjusted to show contextual information associated with a selected user interface control in a desktop computer screen.

FIG. 3 shows a second set of example user interface display screens 80 illustrating a mobile device screen 90 that has been adjusted to show contextual information 92 associated with a selected user interface control 88 in a desktop computer screen 82. The desktop screen 82 includes various user interface controls 84, including a save button 116 and the bank drop-down menu 88, which is part of a user selection 86.

Note that the user interface control selection 86 may also include displayed data, i.e., data (e.g., bank name) displayed in association with the user interface control 88.

In the present example embodiment, selection of the user interface control 88 triggers display of contextual information corresponding to the map 92. An address of the bank selected via the desktop user interface control 88 is both depicted on the map (at a geographic location 94) and specified in a hover layer or bubble 96. The bubble 96 includes additional user interface controls 98, which a user may employ to trigger additional software actions (e.g., getting directions, etc.) that are associated with the displayed data.

For the purposes of the present discussion, a location of a mobile device is considered to represent a location of a user of the mobile device. In certain cases, the fact that a user is currently carrying their mobile device can be confirmed, such as by issuing a prompt to the user, e.g., a prompt for a password, which may be displayed on the mobile device. When the user responds to the prompt, this may facilitate confirming that the location of the user coincides with the location of the mobile device.

In general, in the present example embodiment, for a specifically selected data field or user interface control that has focus in the desktop screen 82 (and/or an additional monitor), the mobile device touch screen 26 serves as an additional display and/or input device to show contextual information and/or user interface controls associated with software actions.

The displayed data and associated visual style shown in the mobile device screen 90 may be varied in accordance with mobile device capabilities (e.g., available computing resources and display resources, such as screen size and resolution), to facilitate enhancing user experience.

In an example use case, a user working with financial application decides to determine a nearest banking location and then to travel to the banking location. By presenting the bank choices contextually on the mobile device screen 90, banks can be displayed via an intuitive map format, thereby taking advantage of extra screen real-estate. The user can then more easily gauge which bank is closest and then quickly load driving directions to take on the go to get there.

The example use case includes the user selecting a data field or user interface control 88 via the selection 86, resulting in a prompt or display of options enabling a user to specify or select a particular bank. The mobile device screen 90 then updates to show contextual information and actions for the currently selected data field 88.

The user then has an option to select a bank via a visually rich map format, which may be preferable to use of a drop-down menu choice list. The map view 92 may provide additional contextual information to facilitate bank selection. If the user wishes to then travel to the bank, the user can quickly query and load directions directly using the mobile device screen 90. Any bank that a user selects via the map 92 then appears as the selected bank in the user interface control 88.

In summary, presentation of contextual information on a mobile device for selected content from a desktop device (including displayed data and/or underlying data). The contextual data can be static or dynamic (e.g., subject to change) and be presented based on predetermined mapping rules. The predetermined mapping rules may include rules developed via system learning of user behaviors, i.e., based on user software usage history.

For the purposes of the present discussion, underlying data may be any data used to generate a user interface display screen feature or that is otherwise associated with a user interface display screen feature, including displayed data. For example data underlying a visualization may include data objects, features and data characteristics represented by a node or link of the visualization. For example, a node representing a person in an enterprise organizational chart may be associated with additional underlying data that includes, for example, employee job title, phone number, address, and so on.

Figure 4:
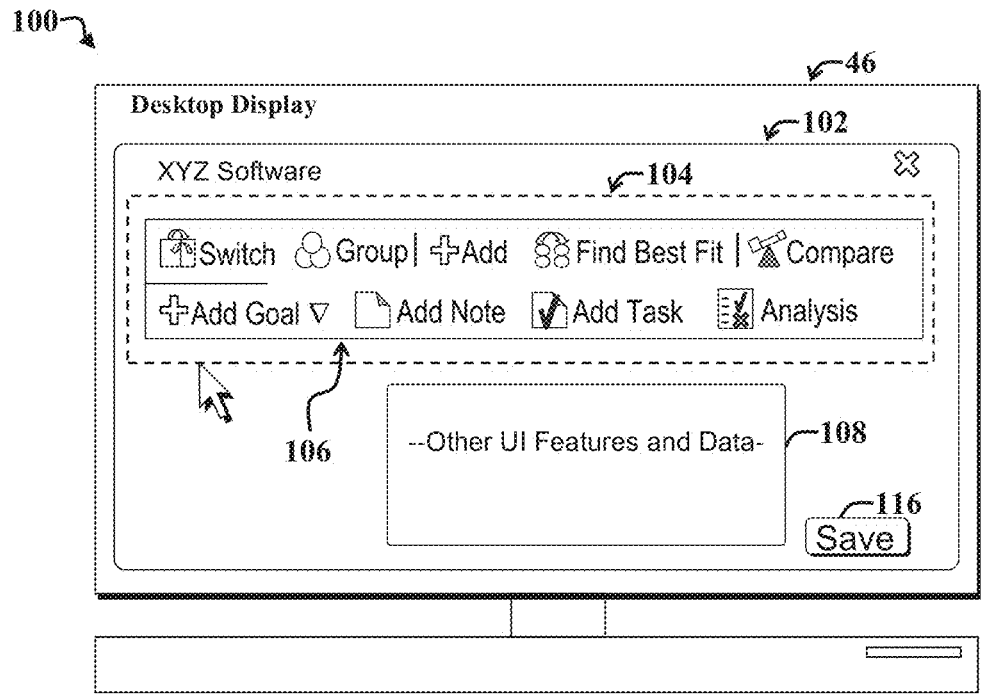
FIG. 4 shows a third set of example user interface display screens illustrating a mobile device screen that has been adjusted to show user interface controls and contextual information in response to user selection of a toolbar in a desktop computer screen.
Figure 4:
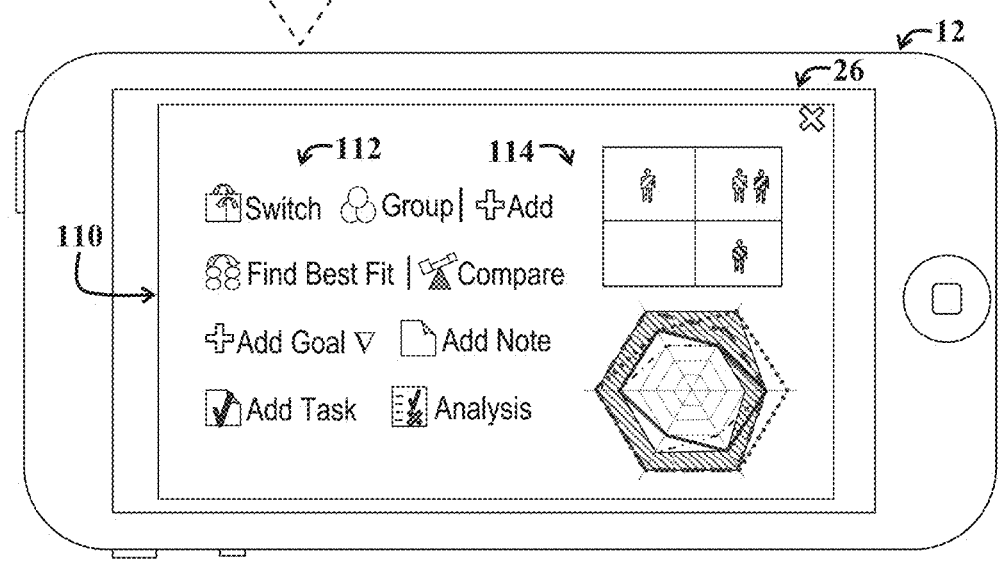

FIG. 4 shows a third set of example user interface display screens 100 illustrating a mobile device screen 110 that has been adjusted to show user interface controls 112 and contextual information 114 in response to user selection of a toolbar 106 (e.g., made via a bound box selection 104) in a desktop computer screen 102. For illustrative purposes, the desktop screen 102 is shown including additional user interface features and data 108 and the save button 116. Note that various embodiments discussed herein may commit adjusted data and functionality to memory, e.g., via use of a save button, or automatically in accordance with predetermined rules or settings.

For the purposes of the present discussion, a toolbar may be any section or portion of a user interface display screen that includes plural user interface controls, e.g., buttons, widgets, menus, etc.

The third set of example user interface display screens 120 illustrate an example method that involves area selection 104 of the toolbar 106 (but which could include another page region, page section, subheader, sub-subheader, and so on, that has focus on a desktop device, laptop device, or other device), and use of the mobile device 12 to serve as an additional display and/or input device to show contextual information and/or actions associated with the initial selection 104.

In an example use case, a call center application is used to display the desktop screen 102. The call center application can leverages additional screen real estate of the mobile device 12 to illustrate additional contextual information 114 (such as one or more visualizations), which may provide additional details, such as caller identification, call queue, associated statistics data, and so on. This may enable a call center agent view relevant available information to facilitate rapid and informed decision making, thereby enabling the agent to more efficiently and effectively close calls.

The example use case includes a call center agent selecting (or otherwise bringing into focus) the toolbar 106. The mobile device screen 110 then updates to show contextual information 114 and any other relevant information and actions (corresponding to the user interface controls 112) associated with the selected toolbar 106.

Since the call center agent (i.e., user) focused or otherwise selected to the toolbar 106, the agent can now quickly access toolbar related information and functionality 112, 114 via the mobile device 12. The agent may view a call queue in greater detail to enhance situational awareness of customer dynamics of the call queue. Additional information, such as user performance ratings and statistics may be readily available via the mobile device 12 to facilitate providing and/or accessing, for example, dynamic feedback.

In summary, the third set of example user interface display screens 100 illustrate an example method involving selection of a first portion 104 of a first user interface display screen 102, which includes a toolbar 106 with user interface controls, resulting in display of corresponding items, i.e., user interface controls 112 and data 114 depicted in a mobile device screen 110. The user interface controls 112 are responsive to user input to selectively affect features of the desktop screen 102 and the mobile device screen 110.

Figure 5:
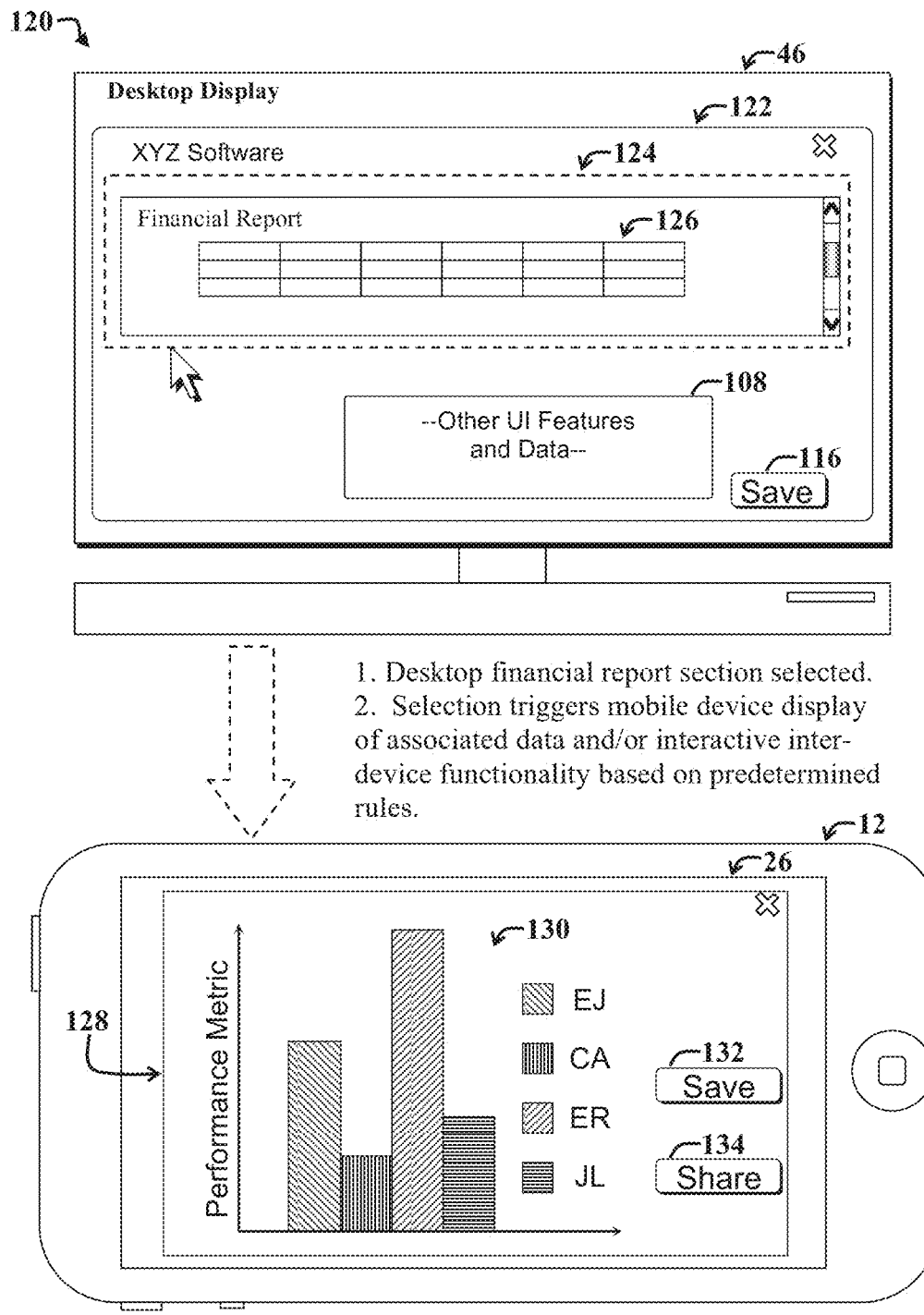
FIG. 5 shows a fourth set of example user interface display screens illustrating a mobile device screen that has been adjusted to show an information visualization in response to user selection of a financial report section of a desktop computer screen.

FIG. 5 shows a fourth set of example user interface display screens 100 illustrating a mobile device screen 128 that has been adjusted to show an information visualization 130 in response to user selection of a financial report section 124 of a desktop screen 122. The updated mobile device screen 128 illustrates an example bar chart (i.e., an example type of visualization) 130 in combination with a save button 132 and a share button 134, which enable saving and posting the bar chart 130 to device memory or a social network (or other network, device, or website), respectively.

Note that selection of the share button 134 is not limited to posting to a social network. For example, functionality for sending emails or text messages with content to be shared or sent may also be readily incorporated into embodiments discussed herein, without departing from the scope of the present teachings.

Accordingly, the fourth set of example user interface display screens 120 depict a method for saving and sharing data (and/or functionality) from a desktop application via a mobile device.

In an example use case, a user selects the financial report 124 and accompanying tables, data, and user interface controls 126, enabling the user to send whole or partial object/contextual data from their desktop session to quickly update colleagues. Note that mobile devices may contain most up-to-date contact lists. Accordingly, enabling users to share project data via mobile devices may be particularly useful for modern enterprise computing environments.

In an example use case, a sales representative (i.e., user) reviewing product sales data via the desktop display screen 124 employs the mobile device 12 to view the data graphically via the visualization 130. The sales representative sees important update that colleagues that travelling colleagues may not have noticed. The sales representative then shares this information via his/her mobile device 12 via a group Short Message Service (SMS) message that he/she had already set up on his/her mobile device 12 and their internal social network.

Note that in certain implements, actual data and/or functionality may be shared or sent in accordance with embodiments discussed here. For example, in one implementation, a secure hyperlink can be shared or otherwise sent that points to a secure website to enable access to the data by a recipient of the hyperlink. The enabling or disabling of such mechanisms and features may be configurable by an administrator.

The example use case includes the sales representative navigates to the financial report 124 and clicks on a region of the financial report 124 to bring the financial report 124 into focus (or employs another selection mechanism to select the financial report 124). The mobile device screen 128 then updates to show an alternative view for the currently selected financial report 124 and accompanying table 126, including a visualization 130 depicting data in the table 126 of the selection 124.

The visualization 130 and accompanying user interface controls 132, 134 represent a rich interactive graph, which may include additional user interface controls for enabling the sales representative to view and/or interact with the underlying data in the selected region 124 in an a manner that may otherwise be difficult using the desktop computer 46 alone. Relevant data changes, such as results of data filtering operations performed by the sales representative via the mobile device 12 are reflected in the original selection 124, i.e., portion of the desktop screen 122.

At a later date, the sales representative can restore (or otherwise trigger display of) the primary object (represented by the financial report 124) on a desktop computer (or other computing device) by activating saved contextual view of the mobile device 12 (which may have been saved via the save button 132 of the mobile device screen 128).

In a second example use case, a project manager (i.e., user) wishes to take home important rich graphs to interact with later and in more detail while he/she is commuting home. The project manager navigates to financial reports and employs a mouse cursor to click on a region of the display screen 122, resulting in the selection 124. The mobile device screen 128 then updates to show alternative view for the current selected table 126. A rich interactive graph 130 displays allowing user to view/interact with data in the selected region/portion 124 in alternative manner. Relevant data changes, such as results of data filtering that the project manager implements via the mobile device 12 are then reflected in original region/portion 124 on the desktop device 46.

Note that a user may "take home" data, e.g., commit the data to computer memory, such as by saving the data to the mobile device 132 and/or by sending himself/herself data via selection of the share button 134.

In summary, the fourth set of example user interface display screens 120 facilitate sharing interactive object detail views and/or object contextual views between desktop and mobile devices. A user may send entire or partial object/contextual data from their desktop session to quickly update colleagues.

Use of user interface controls 132, 134 for saving and/or posting data represent user options for saving data included in the initial financial report selection 124 and/or included in the mobile device screen 128. The share button 134 represents a user option to post data included in the selection 124 (also called first portion) and/or illustrated in the mobile device screen 128 (including any underlying data of the visualization 130) to a server, such as a social network server or other website or enterprise network server.

Figure 6:
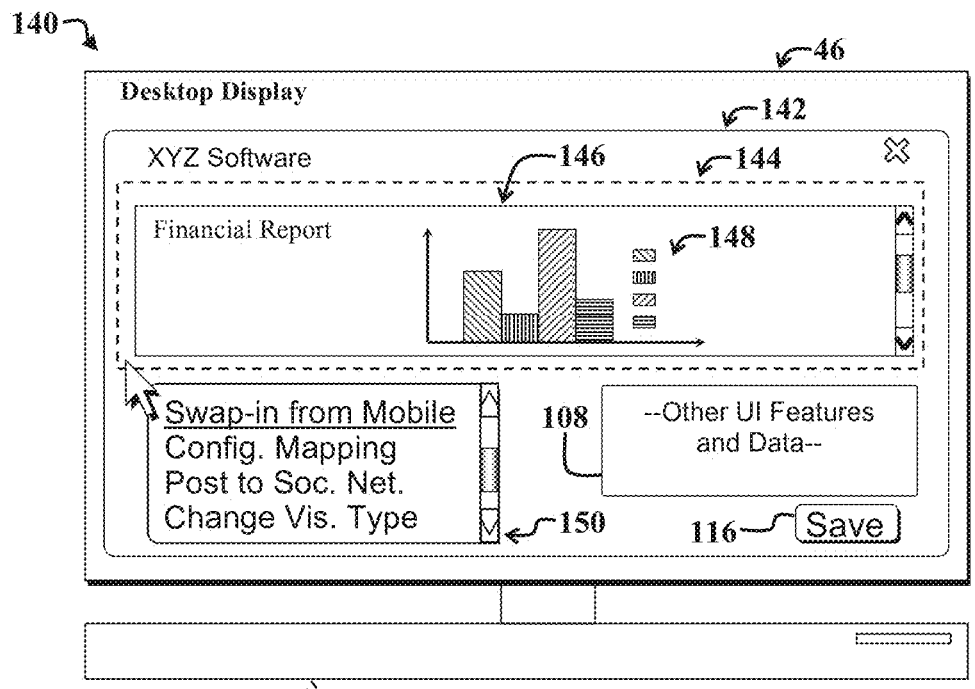
FIG. 6 shows a fifth set of example user interface display screens illustrating information rendered in a mobile device screen replacing a selected section of a desktop computer screen.
Figure 6:
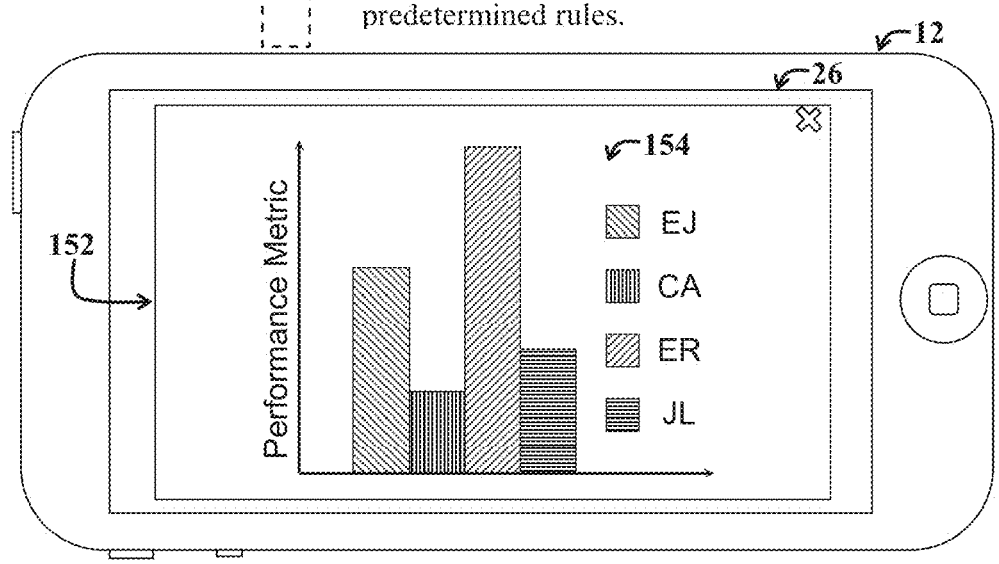

FIG. 6 shows a fifth set of example user interface display screens 140 illustrating information rendered in a mobile device screen 152 replacing a selected section 144 of a desktop computer display screen 142. The desktop screen 142 includes a second example financial report 146, which is part of the selection 144. An example right-click drop-down menu 150 provides various additional user options for configuring underlying software and performing software actions relevant to various embodiments discussed herein.

Note that use of the right-click menu 150 is illustrative and that other implementations are possible. For example, in certain implementations, a swap-in button is provided on the mobile device, such that swapping-in content is driven by the mobile device. Hence, while the user interface display screens 140 illustrate a particular embodiment involving triggering a swapping in of content from a mobile device screen into a selected portion of a desktop screen, embodiments are not limited thereto. For example, certain alternative implementations do not require a user to select context in a desktop display. In such cases, for example, when a user is viewing a screen via a desktop display, an accompanying mobile device screen may automatically update to show regions that can be swapped in to regions of the desktop screen. If the user selects one of these regions on the mobile device, and then selects a user option to trigger a swap, the desktop screen may automatically update based on predetermined criteria, e.g., programmed settings. A desktop region that was swapped out may then be visible on the mobile device display.

In the present example embodiment shown in FIG. 6, the example right-click drop-down menu 150 includes various example user interface controls representing user options for swapping-in data (and/or other items, such as user interface controls or selected regions of the mobile device 12); for configuring mapping rules (Config. Mapping); for posting selected data to a social network (Post to Soc. Net.); for changing a type of displayed visualization (Change Vis. Type), and so on. Other example user interface controls that may be provided in such a drop-down menu 150 include a user option for specifying a particular selected user interface item as a favorite item or otherwise specifying favorite items or data.

Note that user selection of one or more of the user interface controls in the drop-down menu 150 may trigger display of one or more additional dialog boxes and/or user interface controls for enabling a user to provide additional input and trigger additional software activities, such as for specifying mapping rules. Furthermore, note that while the drop-down menu 150 is shown in the desktop screen 142 that embodiments are not limited thereto. For example, the drop-down menu 150 or similar drop-down menu or other types of user interface controls and mechanisms may be accessible via or may otherwise appear in the corresponding mobile device screen 152.

In an example use case, the fifth set of example user interface controls 140 facilitate implementation of a method that involves selective changing of data views on the desktop computer 46 (and/or other computing device) via the mobile device 12. This represents another method and/or mechanism for facilitating saving and sharing of data and functionality between a mobile device and desktop computer.

In the present example use case, a user triggers swapping in of a visualization 154 depicted in the mobile device screen 152 into a corresponding visualization 148 of a financial report 146 in a selected region 144 of the desktop display screen 142. For example, when viewing and/or entering data in enterprise software used to generate the desktop screen 142, a user realizes that some displayed regions are less useful than others for the current task at hand. Accordingly, the user employs the mobile device 12 to swap in/out data regions (e.g., corresponding to the visualization 154) to selected portions of the desktop screen 142, e.g., which may represent less used or otherwise overwritable portions.

In the present example use case, a sales representative (i.e., user) determines that specific sales data is needed to follow up with important leads and opportunities, but information pertaining to such leads and opportunities are not immediately visible via the desktop screen 142. The sales representative then triggers swapping in of desired data from the mobile device screen 152 into the selected portion 144 of the desktop screen 142. For example, the sales representative may employ enterprise desktop software with a default setup that does not display a particular data view needed to make certain decisions, but the data view is accessible via the mobile device 12. The user can employ a "Swap-in from Mobile" user option from the drop down menu 150 to trigger embedding the visualization 154 from the mobile device screen 152.

In summary, the fifth set of example user interface display screens 140 depict a method enabled by software that includes user selection of a first portion 154 of a mobile device screen 152 to replace and/or augment a second selected portion 146 of a desktop screen 142 after issuance of a signal (e.g., to the mobile device 12 in response to user selection of the "Swap-in from Mobile" option from the drop-down menu 150).

The underlying software may access predetermined mapping rules in association with the "Swap-in from Mobile" option to further determine how the mobile device selection 154 is mapped to the corresponding desktop device screen selection 144. For example, in certain cases, the transplanted visualization 148 and/or other user interface features are resized or otherwise adjusted in accordance with screen resolution, graphics capabilities, and other computing resources available to the desktop computer 46, as specified by the mapping rules.

Figure 7:
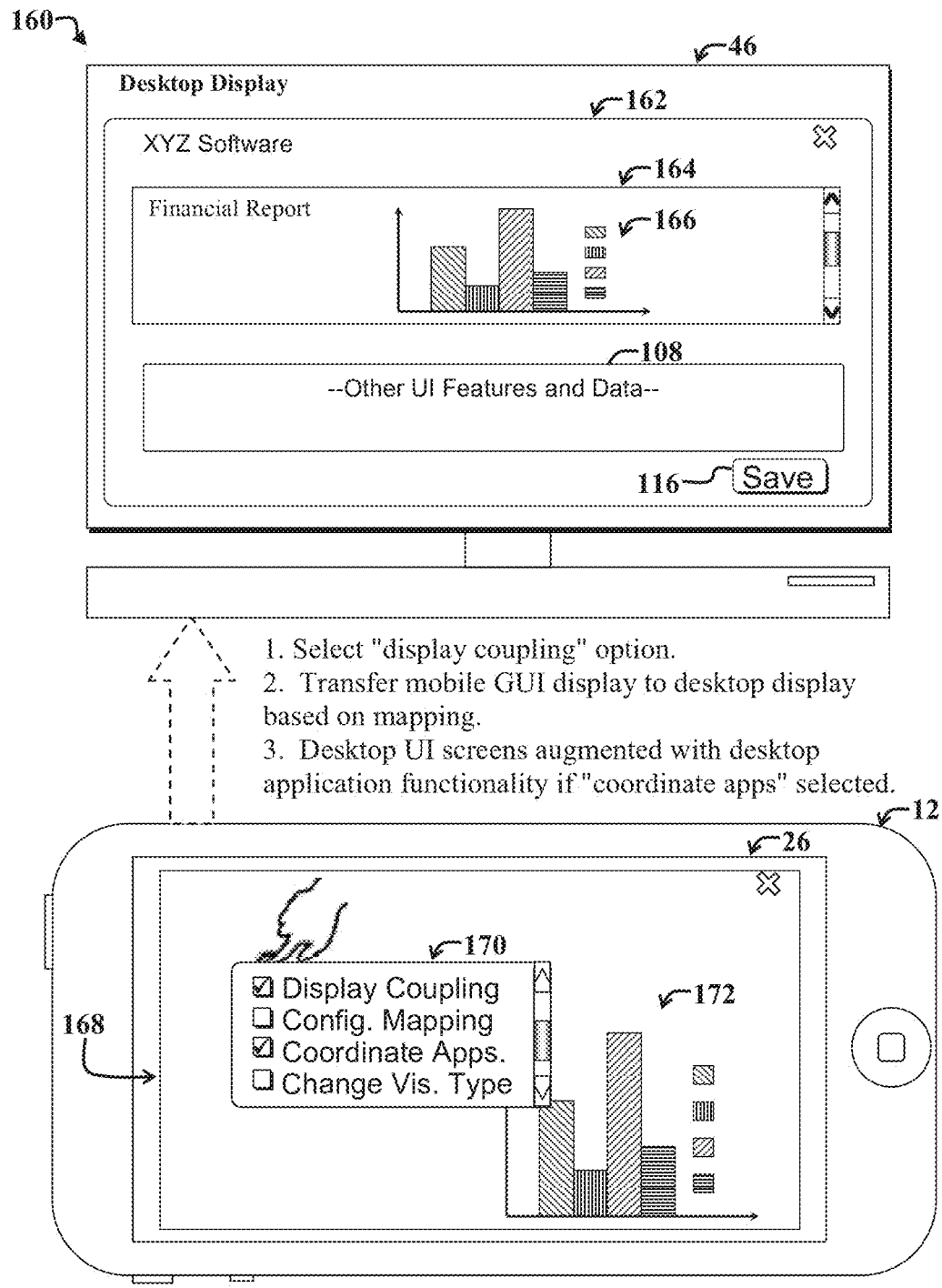
FIG. 7 shows a sixth set of example user interface display screens illustrating transfer of data and functionality from a mobile device to a desktop computer in accordance with software running on or accessible to the mobile device.

FIG. 7 shows a sixth set of example user interface display screens 160 illustrating transfer of data and functionality from a mobile device 12 to a desktop computer 46 in accordance with software running on or accessible to the mobile device 12. In the present example, the mobile device is employed as central computing device for use with different monitors, such as a display monitor coupled to the desktop computer 46.

Figure 8:
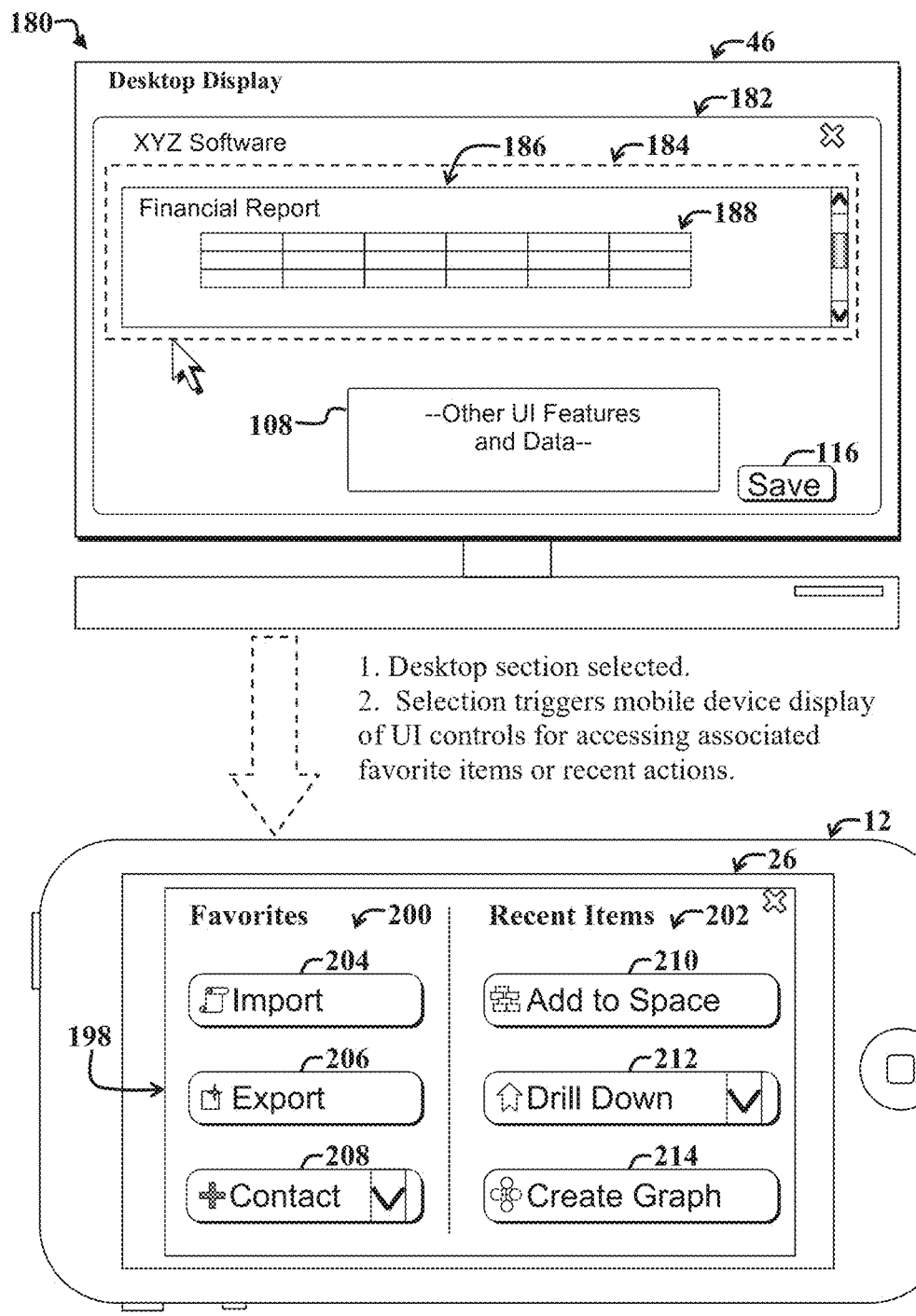
FIG. 8 shows a seventh set of example user interface display screens illustrating display of particular user interface controls, including favorites and recently used controls, in a mobile device screen based on a selected portion of a desktop computer screen.

Note that the embodiment illustrated via the user interface display screens 160 of FIG. 7 differs from the embodiment shown in FIG. 8 in various ways. For example, the embodiment illustrated via the user interface display screens 140 of FIG. 6 illustrate data and/or functionality from a mobile device screen 152 replacing a selected region 144 of a desktop device screen 142 via user manipulation of one or more controls (e.g., controls 150) of the desktop screen 142, whereas the user interface display screens 160 of FIG. 7 illustrate an entire displayed user interface 168 of the mobile device 12 being displayed via the desktop device 46 in response to user manipulation of the mobile device 12. Note that in certain implementations, such swapping-in or swapping-out of data and/or user interface controls may be implemented automatically, i.e., "behind the scenes," without departing from the scope of the present teachings.

The mobile device 12 illustrates an example mobile device screen 168, which includes a visualization 172 and further illustrates an example tap-and-hold drop-down menu 170 that may be accessed via the mobile device touch screen 26. The drop-down menu 170 provides various user options, including a user option for coupling the touch screen 26 and all display screens 168 illustrated thereby with the desktop computer 46 and accompanying display screens 162.

In an example use case, a user employs the drop-down menu 170 to select a display coupling option (Display Coupling) and an application coordination user option (Coordinate Apps.). In response to the user selections, the desktop screen 162 is updated with content 164, accompanying graphics 166, and user interface controls 116, 108 that incorporate the content 172 depicted via the mobile device screen 168.

User selection of the "Coordinate Apps." user option enables running of full featured applications on the desktop computer 46 that are deemed to be related (e.g., via mapping rules) to the applications running on the mobile device and used to generate the mobile device screen 168. Accordingly, functionality and data provided via the mobile device screen 168 may be augmented with coordinated or associated applications running on the desktop computer 46 and used to display the desktop screen 162.

Alternatively, if the "Coordinate Apps." user option is not selected, the content of the mobile device 168 may be directly transplanted, such that the content displayed via the desktop screen 162 is limited to content displayed via the mobile device screen 168. However, in this case, the resolution of the content displayed via the desktop computer 46 may be updated or enhanced in accordance with any enhanced display capabilities (and/or other capabilities) of the desktop computer 46.

In a more specific example use case, a user determines that they only need a mobile device 12 to save customer data. When at a particular office, the user can connect to a monitor connect a monitor, keyboard, mouse device, and so on, via Bluetooth, WiFi, and/or other mechanisms, to make use of a full desktop setup and resources. The mobile device 12 is then further used as a second monitor, and contextual information from the desktop computer 46 can be used to facilitate implementing other embodiments discussed herein. Such functionality and methods may be particularly useful for users that frequently travel.

The specific example use case may involve a sales representative (i.e., user) that frequently travels between office headquarters the United States and an office division in France. Instead of transporting a laptop or desktop computer between the United States and France, the user instead simply travels with the mobile device 12, which runs software as discussed herein for facilitating enabling the user to have a full desktop enterprise experience regardless of their office location.

At headquarters, mobile device may provide a primary user computing experience. The user can run enterprise applications directly from the mobile device 12 connected to the desktop computer 46 and/or accompanying monitor, and may access the input devices (e.g., keyboard, computer mouse, etc.) for a traditional desktop experience.

In summary, when the user travels between work sites, the user only needs to take the mobile device 12. When the user is at another work site, the user can quickly connect his/her mobile device 12 for a similar computing experience as at headquarters.

FIG. 8 shows a seventh set of example user interface display screens 180 illustrating display of particular user interface controls 200, 202, including favorites 200 and recently used controls 202 in a mobile device screen 198 based on a selected portion 184 of a desktop computer screen 182. Note that the various user interface controls 200, 202 and corresponding sections are merely illustrative and may vary, such that more, fewer, and/or different types of user interface controls and sections may be provided, without departing from the scope of the present teachings.

In the present example embodiment, a user has selected a portion 184 of a desktop screen 182, which includes a financial report 186 and accompanying table 188. Usage history pertaining to how a user has been working with the accompanying financial software (e.g., XYZ software), such as which user interface controls have been selected, what data has been selected, any favorite items or user interface controls that have been marked, and other such contextual information is logged by underlying device integration software (such as the software 28, 22 of FIG. 1). Based on this information, certain controls, functionality, and/or data will be shown in the mobile device screen 198.

In accordance with certain mapping rules that have been configured to trigger display of user interface controls and data 200, 202 via the mobile device screen 198 in response to a user selection 184 made via a desktop screen 182, user selection of the financial report 186 triggers display of associated stored contextual information. In the present example embodiment, the stored contextual information indicates that the user selection 184 is associated with a list of favorite items 200 and a list of recently used or accessed items 202. Examples of favorite items 200 include a user interface control for importing data 204, a user interface control for exporting data, and a user interface control for adding contact information to a contact register or other storage mechanism.

The favorite items 200 are said to be associated with the user selection 184 via mapping rules. The mapping rules may specify, for example, that contact information to be added in response to user selection of the contact user interface control 208 corresponds to one or more contacts indicated in a selected table 188 of the selected portion 184.

Alternatively, the "Contact" user interface control 208 represents a user option to activate functionality for contacting an author of the selected financial report 186 or otherwise contact a person listed in the table 188. For example, user selection of the "Contact" user interface control 208 may trigger activation of an email client on the desktop computer 46, and/or a text message application on the mobile device screen 198. Alternatively, or in addition, selection of the "Contact" user interface control 208 may trigger the mobile device 12 to make a phone call to the associated contact. Note that the "Contact" user interface control, while shown as a drop-down menu in FIG. 8, may be implemented via a single user interface control (e.g., a button, field, or other control) enabling a user to update contact information via a single field or user interface interaction.

Similarly, the selection of the first portion 184 of the desktop screen 182 has triggered display of the associated recent items 202. Examples of possible recently used items include an "Add to Space" user interface control 210, a "Drill Down" user interface control 212, and a "Create Graph" user interface control 214 for providing respective user options to add data to a particular network space or data object; to drill down to view additional details of data underlying the selected table 188 and/or accompanying financial report 186; and to create a visualization, such as a graph depicting data in the financial report 186, respectively.

Hence, the seventh set of example user interface display screens 180 illustrate a method that involves display of one or more user interface features (e.g., recent items 202) in accordance with recency of use information, which includes items 210-214, which have been most recently accessed or employed by a user, or alternatively, items which have been most frequently used within a predetermined time interval. The items have been most recently and/or most frequently accessed by a user via the desktop screen 182, yet they may appear in the mobile device screen 198.

User activation of one or more of the user interface controls 200, 202 of the mobile device screen 198 may result in activation of functionality enabling adjustments to the desktop screen 182 and/or the mobile device screen 198.

In an example use case, a mid-level accountant (i.e., user) working with a general ledger application (e.g., used to generate the desktop screen 182) associated with a particular journal can quickly access key related data (e.g., line level) and/or functionality. Favorite and recent actions 200, 202 appear in the mobile device screen 198 when the user is utilizing the general ledger application. Actions such as "Contact Author" (e.g., corresponding to the "Contact" user interface control 208) enable the user to efficiently call the journal author, thereby taking full advantage of the integration of the mobile device 12 with the desktop computer 46, while enhancing user efficiency and underlying software usability.

In the present use case, when the accountant focuses on a particular page or document (representing the selection 184), specific favorite items 200 and/or recent items and/or actions 202 appear in the mobile device screen 198. If the accountant wishes to contact the document author, the ability to do so is a click away, as is a designated favorite action 208.

In summary, the seventh set of example user interface display screens 180 illustrate a method for presenting contextual information and access to functionality on a mobile device 12 for selected content 184 from a desktop computer 46, where the selected content may range from page level to data field level (and may include data underlying the selection but not readily visible in the desktop screen 182). The respective contextual data and functionality can be static or dynamic and can be presented based on predetermined rules (i.e., so-called mapping rules) and/or or via system learning of user behaviors.

Note that for specific application, page, region, subheader, sub-subheader, or even a data field, the mobile device 12 may update to show the user's favorite items 200 and/or common and/or recent actions (corresponding to the user interface controls 202). This enables a user to quickly access important actions in a consistent and easily accessible manner.

The user can configure the contextual actions differently or similarly for all areas of a desktop screen 182. User access to such configuration options may be provided via a drop-down menu, such as the drop-down menu 150 of FIG. 6. Note that for a specific page, the user may configure underlying device integration software to trigger display of only recent actions (i.e., recently used user interface controls 202), while for another specific application the user may wish to see both favorite and common actions/items 200, 202, and so on.

Figure 9:
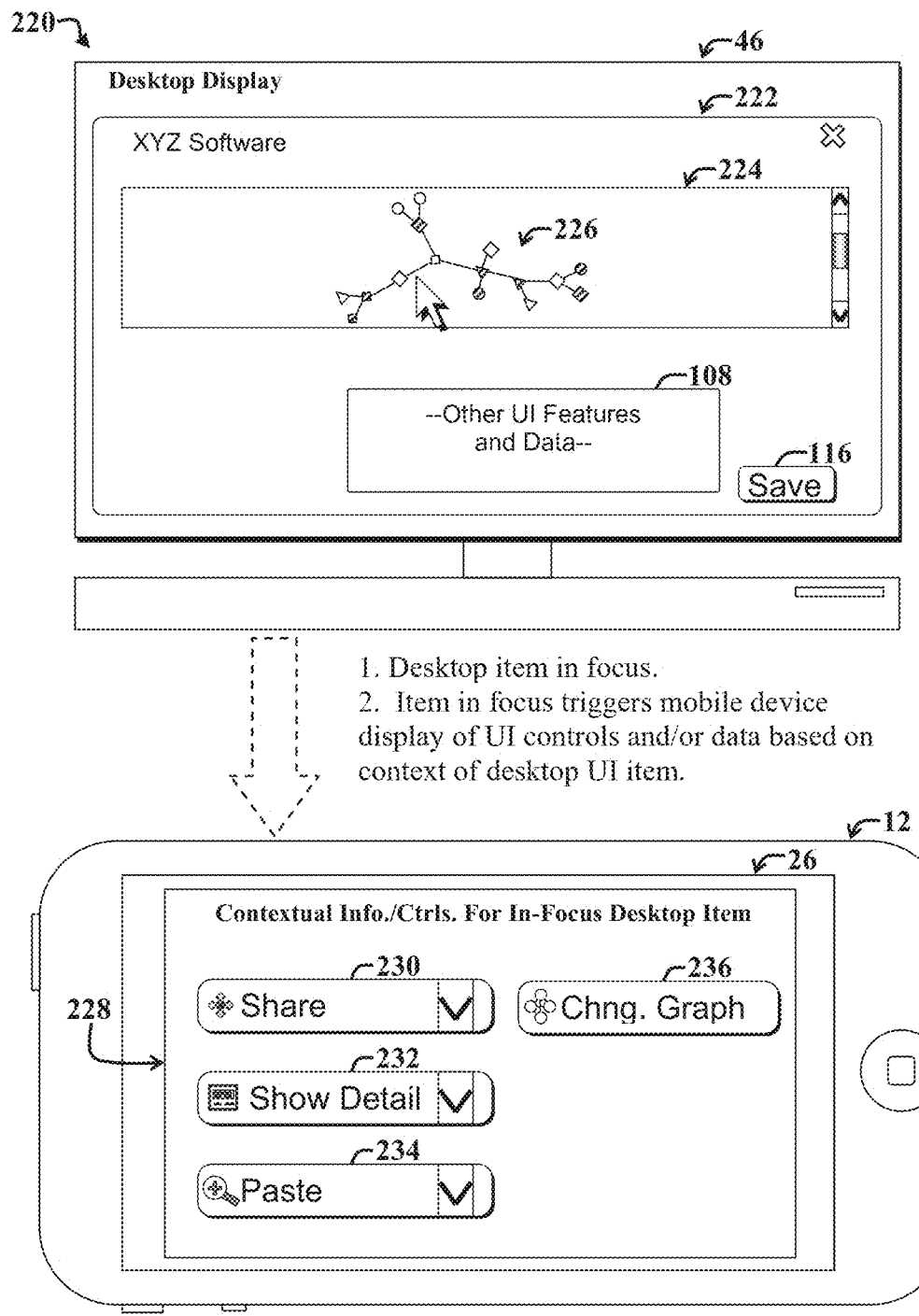
FIG. 9 shows an eighth set of example user interface display screens illustrating display of particular user interface controls that are related, based on contextual information, to a selected or in-focus item in a desktop computer screen.

FIG. 9 shows an eighth set of example user interface display screens 220 illustrating display of particular user interface controls 230-236 of a mobile device screen 228 that are related, based on contextual information, to a selected or in-focus item 226 in a desktop computer screen 222.

In the present example embodiment, a user has selected a line graph visualization 226, thereby bringing the visualization 226 into focus. For the purposes of the present discussion, a portion of a user interface display screen, such as a selected region and/or accompanying a component(s) or element(s) of a user interface display screen, is said to be in-focus if it is selected, highlighted, or otherwise activated, such as via a user mouse click on a dialog box, control, or other user interface feature representing or otherwise included in the section.

In the present example embodiment, user selection of the visualization 226 automatically triggers display of user interface controls 230-236 in the mobile device screen 228 for manipulating the visualization 226. The controls 230-236 are said to be selected based on contextual information, e.g., contextual information indicating that the selected item 226 is a particular graph. The contextual information may further include information pertaining to data that is illustrated via the graph 226, whether additional details may be displayed for objects represented via nodes of the graph 226, and so on.

Note that in the present example embodiment, a user and/or system has configured underlying mapping rules to specify that user interface controls 230-236 displayed via the mobile device 12 are to be automatically generated based on contextual information associated with an item 226 of the desktop screen 222.

In an example use case, a sales representative (i.e., user) copies an image or graph of interest to the clipboard from a webpage and decides to paste the image (e.g., graph 226) into the application used to generate the desktop display screen 222. The user also wishes to immediately share the image 226 with colleagues. Accordingly, the device integration software recognizes that the user has just copied an image to the clipboard; then refreshes the mobile device display screen 228 to show actions (represented by user interface controls 230-236), including a user interface control 230 adapted to facilitate sharing the image 226.

The various user interface controls 230-236 represent dynamic contextual actions appearing in the mobile device screen 228 based on what 226 the user has selected and/or brought into focus, and/or past software usage behavior and underlying mapping rules. Note that in certain implementations, the underlying device integration software may generate prompts and/or user interface display screens and accompanying controls, whereby a user may respond with further input in response to a particular selected contextual action 230-236 and/or selected item 226. The prompts may include, for example options to specify additional details as to how a given mapping of the item 226 to features of the mobile device screen 228 should be performed.

The user interface controls 230-236 may be synchronized, such that they automatically update in response to different user selections made via the desktop screen 222. The user interface controls 230-236 may be associated with functionality that may further control or affect items shown in (and functionality provided thereby) the mobile device screen 228 and/or the desktop screen 222.

In certain implementations, the contextual actions associated with the user interface controls 230-236 can be predetermined and/or may represent a combination of dynamically generated actions based on past user behavior (i.e., software usage history) and/or based on other mapping rules, which may be established in whole or in part during initial setup of the underlying device integration software, such as during initial enterprise system setup implementation and/or configuration.

Figure 10:
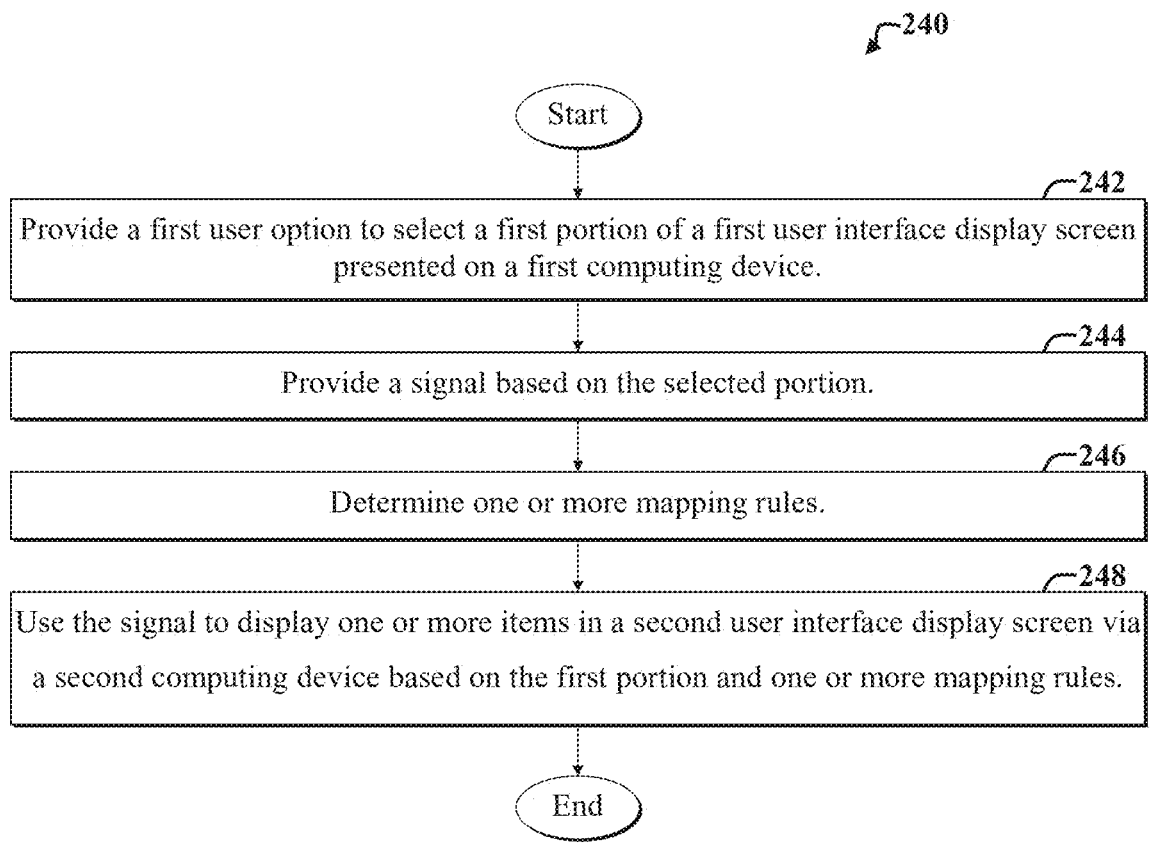
FIG. 10 is a flow diagram of an example method that is adapted for use with the embodiments of FIGS. 1-9.

FIG. 10 is a flow diagram of an example method 240, which is adapted for use with the embodiments of FIGS. 1-9. The example method 240 facilitates integration of functionality between computing devices in an enterprise computing environment, such as by facilitating user interface interactions between computing devices. The example method 240 includes a first step 242, which involves providing a first user option to select a first portion of a first user interface display screen presented on a first computing device.

A second step 244 includes providing a signal based on the selected portion.

A third step 246 includes determining one or more mapping rules.

A fourth step 248 includes using the signal to display one or more items in a second user interface display screen via a second computing device based on the first portion and one or more mapping rules.

Note that the above method 240 may be altered without departing from the scope of the present teachings. For example, the method 240 may be augmented to form a loop involving bi-directional information exchange, such that the second user interface may be used to affect the first user interface. As another example, the method 240 may further include adjusting the mapping rules based on contextual information characterizing the computing environment. Examples of contextual information include data included in the first portion, functionality associated with one or user interface controls included in the first portion, software usage history, marked favorite items or bookmarks that are associated with the portion or corresponding in-focus user interface elements, such as dialog boxes, fields, user interface controls, and so on.

The example method 240 may further include providing a second user option to adjust the mapping rules and/or configure automatic or dynamic adjustment of the mapping rules based on user configurable or specifiable criteria applied to contextual information.

Although the description has been described with respect to particular embodiments thereof, these particular embodiments are merely illustrative, and not restrictive. For example, while various embodiments discussed herein are adapted for use in enterprise computing environments, embodiments are not limited thereto. For example, any computing environment involving plural computing devices may be augmented via systems and methods discussed herein, without departing from the scope of the present teachings.

Furthermore, although specific features and functions may be described as occurring at, or being executed by, a particular device, such features and functions may also be performed in whole or in part on different devices. For example, a step of selecting a desktop region or control may be performed at the desktop computer, itself, or at a different desktop computer, mobile or other device. In general, where desktop or non-mobile devices are described working in conjunction with mobile devices, one or more functions or features may be swapped or shared among the devices. So, for example, a description whereby a portion of a desktop screen display triggers an effect on a mobile device can also apply to the case where a portion of a mobile screen display triggers an effect on a non-mobile device. Often, where a single device has been described it should be apparent that multiple devices can also be used. For example, multiple controls or regions on one or more sourcing devices can be used to generate associated displays or effects on one or more receiving devices.

Accordingly, various embodiments discussed herein can be combined with other embodiments, without departing from the scope of the present teachings. In addition, while certain embodiments are discussed with respect to content being transferred from a desktop device/system to a mobile device or vice versa, that the devices may be interchanged, without departing from the scope of the present teachings. Furthermore, communications and interactions may be bidirectional between devices. For example, with reference to FIG. 6, content and functionality represented via the mobile device screen 152 may occur on the desktop screen 142 and vice versa, such that the mobile device 12 represents the desktop device 46, and the desktop device 46 represents the mobile device 12.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:
    providing a first user option to select a first portion of a first user interface display screen of a first computing device;
    determining first mapping rules based on first contextual information associated with the first portion of the first user interface, wherein the first mapping rules specify a first set of one or more user interface controls to be displayed in a second user interface display screen of a second computing device based on the first contextual information, and wherein the first set of one or more user interface controls are not displayed in the first user interface display screen;
    enabling the first computing device and the second computing device to be remotely located, wherein the first computing device and the second computing device are physically separate and communicate via a server over a network;
    receiving user selection of coordinated applications;
    providing, in response to the receiving of the user selection of the coordinated applications, on the first computing device first applications that are related to second applications running on the second computing device and used to generate the second user interface display screen, wherein functionality and data provided via the second user interface display screen is augmented with the first applications on the first computing device, wherein the first applications are used to display on the first user interface display screen;
    causing the first set of one or more user interface controls to be displayed in the second user interface display screen of the second computing device based, at least in part, on the selected first portion and the first mapping rules;
    receiving user specification of a second portion of the first user interface display screen of the first computing device;
    determining second mapping rules based on second contextual information associated with the second portion of the second user interface, wherein the second mapping rules specify a second set of one or more user interface controls to be displayed in the second user interface display screen of the second computing device based on the second contextual information, wherein the second set of one or more user interface controls are not displayed in the first user interface display screen, wherein the first contextual information of the first portion of the first user interface display screen is a different type than the second contextual information of the second portion of the first user interface display screen, and wherein the first set of one or more user interface controls are a different type of controls than the second set of one or more user interface controls; and
    displaying the second set of user interface controls in the second user interface display screen of the second computing device based, at least in part, on the selected second portion and the second mapping rules.

2. The computer-readable storage medium of claim 1, wherein at least one mapping rule of the first mapping rules specifies how at least one first item is transformed into a second item.

3. The computer-readable storage medium of claim 1, wherein the first portion of the first user interface display screen of the first computing device comprises at least one of one or more of functionality and data associated with a selected region of the first user interface display screen, a table, and a drop-down menu.

4. The computer-readable storage medium of claim 1, wherein the first contextual information comprises information about an originating computing environment.

5. The computer-readable storage medium of claim 1, wherein the first contextual information comprises information about items being worked and displayed in association with the first user interface display screen of the first computing device.

6. The computer-readable storage medium of claim 1, wherein the first contextual information comprises information that facilitates conveying a state of the first user interface display screen.

7. The computer-readable storage medium of claim 1, wherein the first contextual information comprises calendar entries.

8. The computer-readable storage medium of claim 1, modifying the first mapping rules based on the first contextual information.

9. The computer-readable storage medium of claim 1, wherein the first contextual information comprises device resources.

10. The computer-readable storage medium of claim 1, wherein the first contextual information comprises static data.

11. The computer-readable storage medium of claim 1, wherein the first contextual information comprises dynamic data.

12. The computer-readable storage medium of claim 1, wherein the first contextual information is presented based on system learning of user behaviors.

13. The computer-readable storage medium of claim 1, wherein the first mapping rules comprise rules developed via system learning of user behaviors.

14. The computer-readable storage medium of claim 1, wherein the first mapping rules comprise rules based on software usage history.

15. The computer-readable storage medium of claim 1, wherein the first mapping rules are based on computing resources available to the first computing device.

16. The non-transitory computer-readable storage medium of claim 1, the operations further comprising:
   receiving user specification of a third portion of a third user interface display screen of a third computing device, wherein the third computing device, the first computing device and the second computing device are physically separate and communicate via the server over the network:
   determining third mapping rules based on third contextual information associated with the third portion, wherein the third mapping rules specify a third set of one or more user interface controls, wherein the first contextual information of the first portion of the first user interface display screen is a different type than the third contextual information of the third portion of the third user interface display screen, and wherein the first set of one or more user interface controls are a different type of controls than the third set of one or more user interface controls; and
   displaying the third set of one or more user interface controls on the second user interface display screen of the second computing device based, at least in part, on the selected third portion and the third mapping rules.

17. The non-transitory computer-readable storage medium of claim 1, the operations further comprising:
   manipulating the first selected portion of the first user interface display screen of the first computing device with at least one of the first set of one or more user interface controls on the second user interface of the second computing device.

18. The non-transitory computer-readable storage medium of claim 1, the operations further comprising:
   determining the first mapping rules based on one or more characteristics of the second computing device;
   displaying items via the second user interface screen, wherein the items include user interface features previously accessed by a user in association with the first portion, wherein the user interface features include user interface controls;
   selecting and displaying via the second computing device, one or more user interface controls in accordance with a recency of use of the user interface controls included in the user interface features;
   receiving user adjustment to both the first user interface display screen and the second user interface display screen including adjustment to underlying data associated with the first user interface display screen and the second user interface display screen based on functionality associated with the items,
   wherein the items include a saving data user interface control and a posting data user interface control, wherein the saving data user interface control saves data included in the first portion and the posting data user interface control posts data included in the first portion and illustrated via the items to the server,
   wherein one of the first computing device and the second computing device is a desktop computer and the other of the first computing device and the second computing device is a mobile device, wherein the first portion includes an item adapted to replace a preselected portion of the second user interface display screen of the second computing device based on the signal and the first mapping rules,
   wherein the first portion includes a toolbar of the first user interface display screen;
   basing the first mapping rules on data and functionality that is selected or in-focus of another device;
   employing user interface controls displayed via different devices to control software running on the first and second computing devices;
   selectively storing data, using a SetSharedUIInfo( ) function, to be shared between devices, including the first computing device and the second computing device;
   storing, using the SetSharedUIInfo( ) function, the user interface functionality including the user interface controls, wherein the user interface controls are selectively shared between the devices, wherein the mobile computer employs a touch screen;
   using an interaction operations module to enable selection of UI features, determining UI features selected on the devices, storing the first mapping rules and the second mapping rules, and manipulating UI devices, wherein the first mapping rules transform items in the first portion of the first computing device to first items on the second computing device and the second mapping rules transform items in the second portion of the first computing device to second items on the second computing device;
   downloading, using a controller, database objects from an enterprise server system and a server-side device interaction software;
   constructing user interface features based on the database objects;
   displaying the constructed UI features on the touch screen;
   generating a signal characterizing selection of desktop features;
   transmitting the signal to the server-side device interaction software;
   employing the signal, at the controller, with reference to at least one of the first mapping rules and the second mapping rules to generate UI features on the touch screen of the mobile device, wherein the first contextual information and the second contextual information include software usage history and user calendar entries;
   forwarding, to a client-side general user interface (GUI) integration software located on the mobile device, data for representation on the mobile device in response to client-side user input including user input from the devices;
   representing the forwarded data on the mobile device;
   using the mobile device to insert data, UI display screen features, and sections into another one of the devices;
   employing the mobile device as a base for different display screens;
   triggering display of a list of favorite items via the mobile device in response to selection made via another computing device;
   receiving selection of a combination of table rows and table columns on the desktop computer;
   triggering a mobile device display of associated data and interactive functionality based on the selection of the combination of table rows and table columns;

generating a signal based on user selection of a view details user interface control from the mobile device;

forwarding the signal from the view details user interface control to the server;

generating data and functionality for the desk top computer based on the signal for the view details user interface control;

retrieving, at the server, additional details associated with one or more computing objects represented via the combination of table rows and table columns;

receiving selection of an address column of a table of employees displayed on the desktop computer;

updating the mobile device to depict addresses from the address column, wherein the addresses are pinned on a map and the mobile device and the desktop computer are remotely located during the receiving of the selection of the address column and the updating of the mobile device, wherein one or more of the addresses are also displayed in a hover layer on the mobile device;

receiving user selection on the desktop computer requesting a particular bank;

updating the mobile device with a map including a location of the particular bank;

receiving selection of the location of the particular bank from the map;

displaying a toolbar with icons on the desktop computer;

receiving selection of the toolbar on the desktop computer; and displaying, on the mobile device, the icons of the toolbar from the desktop computer.

19. A method for facilitating user interface interactions between computing devices, the method comprising:

providing a first user option to select a first portion of a first user interface display screen of a first computing device;

determining first mapping rules based on first contextual information associated with the first portion of the first user interface, wherein the first mapping rules specify a first set of one or more user interface controls to be displayed in a second user interface display screen of a second computing device based on the first contextual information, and wherein the first set of one or more user interface controls are not displayed in the first user interface display screen;

enabling the first computing device and the second computing device to be remotely located, wherein the first computing device and the second computing device are physically separate and communicate via a server over a network;

receiving user selection of coordinated applications;

providing, in response to the receiving of the user selection of the coordinated applications, on the first computing device first applications that are related to second applications running on the second computing device and used to generate the second user interface display screen, wherein functionality and data provided via the second user interface display screen is augmented with the first applications on the first computing device, wherein the first applications are used to display on the first user interface display screen;

causing the first set of one or more user interface controls to be displayed in the second user interface display screen of the second computing device based, at least in part, on the selected first portion and the first mapping rules;

receiving user specification of a second portion of the first user interface display screen of the first computing device;

determining second mapping rules based on second contextual information associated with the second portion of the second user interface, wherein the second mapping rules specify a second set of one or more user interface controls to be displayed in the second user interface display screen of the second computing device based on the second contextual information, wherein the second set of one or more user interface controls are not displayed in the first user interface display screen, wherein the first contextual information of the first portion of the first user interface display screen is a different type than the second contextual information of the second portion of the first user interface display screen, and wherein the first set of one or more user interface controls are a different type of controls than the second set of one or more user interface controls; and displaying the second set of user interface controls in the second user interface display screen of the second computing device based, at least in part, on the selected second portion and the second mapping rules.

20. A system comprising:

one or more processors; and logic encoded in one or more non-transitory computer-readable storage media for execution by the one or more processors and when executed operable to perform operations comprising:

providing a first user option to select a first portion of a first user interface display screen of a first computing device;

determining first mapping rules based on first contextual information associated with the first portion of the first user interface, wherein the first mapping rules specify a first set of one or more user interface controls to be displayed in a second user interface display screen of a second computing device based on the first contextual information, and wherein the first set of one or more user interface controls are not displayed in the first user interface display screen;

enabling the first computing device and the second computing device to be remotely located, wherein the first computing device and the second computing device are physically separate and communicate via a server over a network;

receiving user selection of coordinated applications;

providing, in response to the receiving of the user selection of the coordinated applications, on the first computing device first applications that are related to second applications running on the second computing device and used to generate the second user interface display screen, wherein functionality and data provided via the second user interface display screen is augmented with the first applications on the first computing device, wherein the first applications are used to display on the first user interface display screen;

causing the first set of one or more user interface controls to be displayed in the second user interface display screen of the second computing device based, at least in part, on the selected first portion and the first mapping rules;

receiving user specification of a second portion of the first user interface display screen of the first computing device;

determining second mapping rules based on second contextual information associated with the second portion of the second user interface, wherein the second mapping rules specify a second set of one or more user interface controls to be displayed in the second user interface display screen of the second computing device based on the second contextual information, wherein the second set of one or more user interface controls are not displayed in the first user interface display screen, wherein the first contextual information of the first portion of the first user interface display screen is a different type than the second contextual information of the second portion of the first user interface display screen, and wherein the first set of one or more user interface controls are a different type of controls than the second set of one or more user interface controls; and displaying the second set of user interface controls in the second user interface display screen of the second computing device based, at least in part, on the selected second portion and the second mapping rules.

\* \* \* \* \*

UNITED STATES PATENT AND TRADEMARK OFFICE
CERTIFICATE OF CORRECTION

PATENT NO. : 11,036,354 B2
APPLICATION NO. : 15/383909
DATED : June 15, 2021
INVENTOR(S) : Schwartz et al.

Page 1 of 1

It is certified that error appears in the above-identified patent and that said Letters Patent is hereby corrected as shown below:

On the Title Page

Item (63) Column 1, under Prior Publication Data, Line 2, below "2018" insert -- Related U.S. Application Data Continuation of application No. 14/024,530, filed on Sep. 11, 2013, now Pat. No. 9,584,583. --.

In the Specification

In Column 4, Lines 57-58, delete "may be may be" and insert -- may be --, therefor.

In Column 9, Line 4, delete "28-38" and insert -- 28-38. --, therefor.

In Column 9, Line 12, delete "deices" and insert -- devices --, therefor.

In Column 10, Line 26, delete "and or" and insert -- and/or --, therefor.

In Column 16, Line 56, delete "an a" and insert -- a --, therefor.

In the Claims

In Column 29, Line 5, in Claim 18, delete "desk top" and insert -- desktop --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*